United States Patent
Kalligudd

(10) Patent No.: US 9,954,664 B2
(45) Date of Patent: Apr. 24, 2018

(54) MICRO VPN TUNNELING FOR MOBILE PLATFORMS

(71) Applicant: Citrix Systems, Inc., Fort Lauderdale, FL (US)

(72) Inventor: Vagish Kalligudd, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/646,141

(22) Filed: Jul. 11, 2017

(65) Prior Publication Data

US 2017/0310445 A1     Oct. 26, 2017

Related U.S. Application Data

(62) Division of application No. 14/708,464, filed on May 11, 2015, now Pat. No. 9,735,943.

(51) Int. Cl.
| | |
|---|---|
| *H04L 5/00* | (2006.01) |
| *H04L 12/46* | (2006.01) |
| *H04L 29/12* | (2006.01) |
| *H04L 12/911* | (2013.01) |
| *H04L 29/06* | (2006.01) |

(Continued)

(52) U.S. Cl.
CPC ........ *H04L 5/0053* (2013.01); *H04L 12/4641* (2013.01); *H04L 47/825* (2013.01); *H04L 61/1511* (2013.01); *H04L 63/029* (2013.01); *H04L 63/0272* (2013.01);

(Continued)

(58) Field of Classification Search
CPC . G06Q 10/06; G06Q 30/0222; H04W 84/045; H04W 76/02; H04W 92/02; H04W 88/08; H04W 12/06; H04W 40/20; H04W 4/24; H04W 88/12; H04W 12/08; H04W 16/32; H04W 60/00; H04W 8/26; H04W 12/02
See application file for complete search history.

(56) References Cited

U.S. PATENT DOCUMENTS

| | | |
|---|---|---|
| 2005/0237982 A1 | 10/2005 | Pankajakshan et al. |
| 2006/0005240 A1 | 1/2006 | Sundarrajan et al. |
| 2015/0052599 A1* | 2/2015 | Champagne ........ H04L 63/0272 726/12 |

OTHER PUBLICATIONS

Jun. 23, 2016—(US) Requirement for Restriction_Election—U.S. Appl. No. 14/708,464.

(Continued)

*Primary Examiner* — Kwasi Karikari
(74) *Attorney, Agent, or Firm* — Banner & Witcoff, Ltd.

(57) ABSTRACT

Methods and systems for providing a virtual private network service on a per mobile application basis are presented. In some embodiments, a mobile device that is connected to private network may determine that one of its mobile applications is requesting to communicate with a private network. The mobile device may intercept one or more system calls to communicate with the private network issued by the mobile application. The mobile device may generate a communication link to a virtual private network (VPN) server on a port of the mobile device through which to transmit communications from the mobile application to the private network. The mobile device may instruct the VPN server to transmit one or more messages from the mobile application to an access gateway for forwarding to the private network.

21 Claims, 10 Drawing Sheets

(51) Int. Cl.
  *H04W 76/02* (2009.01)
  *H04W 12/02* (2009.01)
  *G06F 9/54* (2006.01)
(52) U.S. Cl.
  CPC ........... *H04W 12/02* (2013.01); *H04W 76/02* (2013.01); *H04W 76/022* (2013.01); *G06F 9/545* (2013.01)

(56) References Cited

OTHER PUBLICATIONS

Jul. 20, 2016—(WO) International Search Report—App PCT/US2016/031580.
Oct. 21, 2016—Non-final Office Action—U.S. Appl. No. 14/708,464.
May 5, 2017—(US) Notice of Allowance—U.S. Appl. No. 14/708,464.

* cited by examiner

MICRO VPN TUNNELING FOR MOBILE PLATFORMS

CROSS REFERENCE TO RELATED CASES

This application claims priority to U.S. application Ser. No. 14/708,464 (confirmation number 3531), filed May 11, 2015, entitled "Micro VPN Tunneling for Mobile Platforms," herein incorporated by reference in its entirety.

FIELD

Aspects described herein generally relate to mobile applications for mobile computing devices. More specifically, aspects described herein relate to techniques for providing secure tunneling to mobile devices on a per application basis.

BACKGROUND

More and more people are using mobile devices in personal and business settings for a variety of purposes. These devices are often used by employees to access company resources, sometimes from remote or unusual locations. Increasingly, corporations and other organizations are providing and/or otherwise enabling their employees and other associates with mobile devices, such as smart phones, tablet computers, and other mobile computing devices. As these devices continue to grow in popularity and provide an increasing number of business applications, enterprise mobile applications are providing employees with means to access networked enterprise applications from their mobile device.

Many mobile users connect to an enterprise server executing on a private network from their mobile device over a virtual private network (VPN). Conventional VPN systems use a device level VPN connection such that all network traffic issued by a mobile application from a mobile device is routed to the private network. In such conventional device level VPN systems, application traffic destined to public network addresses from applications executing on the mobile device that do not need to communicate with any portion of the private network is also automatically intercepted. Such interception of application traffic that is not destined to the private network unnecessarily burdens the VPN connection and the device battery and often poses a privacy risk to the end user. In conventional device level VPN systems, packets are intercepted from all applications installed on the mobile device including non-enterprise applications that do not require packets to be intercepted. Such interception of personal applications on a mobile device by an enterprise VPN system causes privacy concerns because individual mobile users' private application data is being intercepted by the enterprise device level VPN. Furthermore, in conventional device level VPN systems, each mobile application is dependent on the operating system of the mobile device for packet interception and creation of a tunneling network interface and in such systems there can only be one device level VPN running at a given time through which all network traffic must be intercepted and tunneled.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards providing secure tunneling to mobile devices on a per application basis.

A first aspect described herein provides a method of determining that a mobile application executing on the mobile device requests to communicate with a private network. One or more system calls to communicate with the private network issued by a mobile application executing on a mobile device may be intercepted. A communication link to a virtual private network (VPN) server may be generated on a port of the mobile device through which to transmit communications from the mobile application to the private network. The VPN server may be instructed to transmit one or more messages from the mobile application to an access gateway for forwarding to the private network.

In some embodiments, a destination network address of at least one message associated with the one or more system calls may be identified. The port to be used for routing communications from the mobile application to the private network may be identified by using a mapping of destination network addresses to ports of the mobile device such that the identified port corresponds to the destination network address of the at least one message in the mapping.

In some embodiments, the port may be a dynamic port of the mobile device. The dynamic port may be allocated to be used for routing communications from the mobile application by assigning a different dynamic port to each of a plurality of mobile applications that requests to communicate with the private network. The VPN server may be a transmission control protocol (TCP) server. To generate the communication link to the VPN server, a TCP server may be generated on the dynamic port and a TCP connection may be generated between the dynamic port and the TCP server.

In some embodiments, it may be determined that the one or more messages are destined to a plurality of different network addresses. A plurality of TCP servers may be generated such that each TCP server of the plurality of TCP servers is generated on a different dynamic port of the mobile device, and such that each dynamic port of a plurality of dynamic ports is generated to transmit communications from the mobile application to the private network for each of the plurality of different network addresses. A plurality of TCP connections may be generated such that each TCP connection corresponds to a communication link through which to transmit communications from the mobile application from each of the plurality of dynamic ports to the private network.

In some embodiments, the port may be a fixed port of the mobile device and the VPN server may be a user datagram protocol (UDP) server. To generate the communication link to the VPN server, the UDP server may be generated on the fixed port and a UDP connection may be generated between the fixed port and the UDP server.

In some embodiments, it may be determined that the one or more messages from the mobile application are destined for the private network. The payload of the one or more messages may be transmitted to the VPN server at the port of the mobile device.

In some embodiments, to instruct the VPN server to transmit the one or more messages from the mobile application to the access gateway, the VPN server may be instructed to generate one or more packets from the one or more messages according to a tunneling protocol of the communication link used to transmit the one or more messages to the private network. The VPN server may be instructed to transmit the one or more packets processed according to the tunneling protocol to the private network over the communication link.

Another aspect described herein provides a method of tunneling domain name system (DNS) messages to a private network. It may be determined that a mobile application executing on the mobile device requests to communicate with a private network. One or more system calls to communicate with the private network issued by the mobile application executing on the mobile device may be intercepted. In response determining that the one or more system calls are addressed to a domain socket path, the domain socket path in the one or more system calls may be replaced with a sandbox path that corresponds to the mobile application. A communication link may be generated to a VPN server at the sandbox path through which to transmit communications from the mobile application to the private network. The VPN server may be instructed to transmit one or more messages from the mobile application to an access gateway for forwarding to the private network.

In some embodiments, it may be determined that the one or more system calls comprise at least one DNS query addressed to a system level DNS process. To replace the domain socket path in the one or more system calls with a sandbox path, the sandbox path may be generated at a local domain socket through which to transmit communications from the mobile application to the private network. A VPN server may be generated for that mobile application such that the VPN server is communicatively coupled to the local domain socket.

In some embodiments, an application specific DNS process may be generated at the VPN server that is communicatively coupled to the local domain socket. A destination network address of at least one message associated with the one or more system calls may be identified. The at least one message may be transmitted to the VPN server that is communicatively coupled to the local domain socket for DNS resolution. The application specific DNS process at the VPN server may be instructed to transmit the one or more messages to the access gateway for forwarding to the private network. In response to determining that the at least one DNS query needs to be resolved by the system level DNS process, the at least one message associated with the one or more system calls may be transmitted to the system level DNS process for DNS resolution.

In some embodiments, to instruct the VPN server to transmit the one or more messages from the mobile application to the access gateway, the VPN server at the sandbox path may be instructed to generate one or more packets from the one or more messages according to a DNS protocol of the communication link used to transmit the one or more messages to the private network. The VPN server may be instructed to transmit the one or more packets processed according to the DNS protocol to the private network over the communication link.

In some embodiments, it may be determined that a plurality of different messages from a plurality of different mobile applications executing on the mobile device are destined for the private network. A plurality of sandbox paths may be generated such that each sandbox path of the plurality of sandbox paths is generated at a different local domain socket of a plurality of local domain sockets to transmit communications from a corresponding mobile application of the plurality of different mobile applications to the private network. A plurality of VPN servers may be generated for the mobile application such that each of the plurality of VPN servers is communicatively coupled to a corresponding local domain socket of the plurality of local domain sockets. A plurality of application specific DNS processes may be generated such that each application specific DNS process executes at a corresponding VPN server of the plurality of VPN servers that is communicatively coupled to a corresponding local domain socket of the plurality of local domain sockets.

Additional aspects described herein provides an apparatus having one or more processors, one or more display screens, and memory storing instructions that, when executed by at least one of the processors cause the computing device to perform the methods set forth above.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
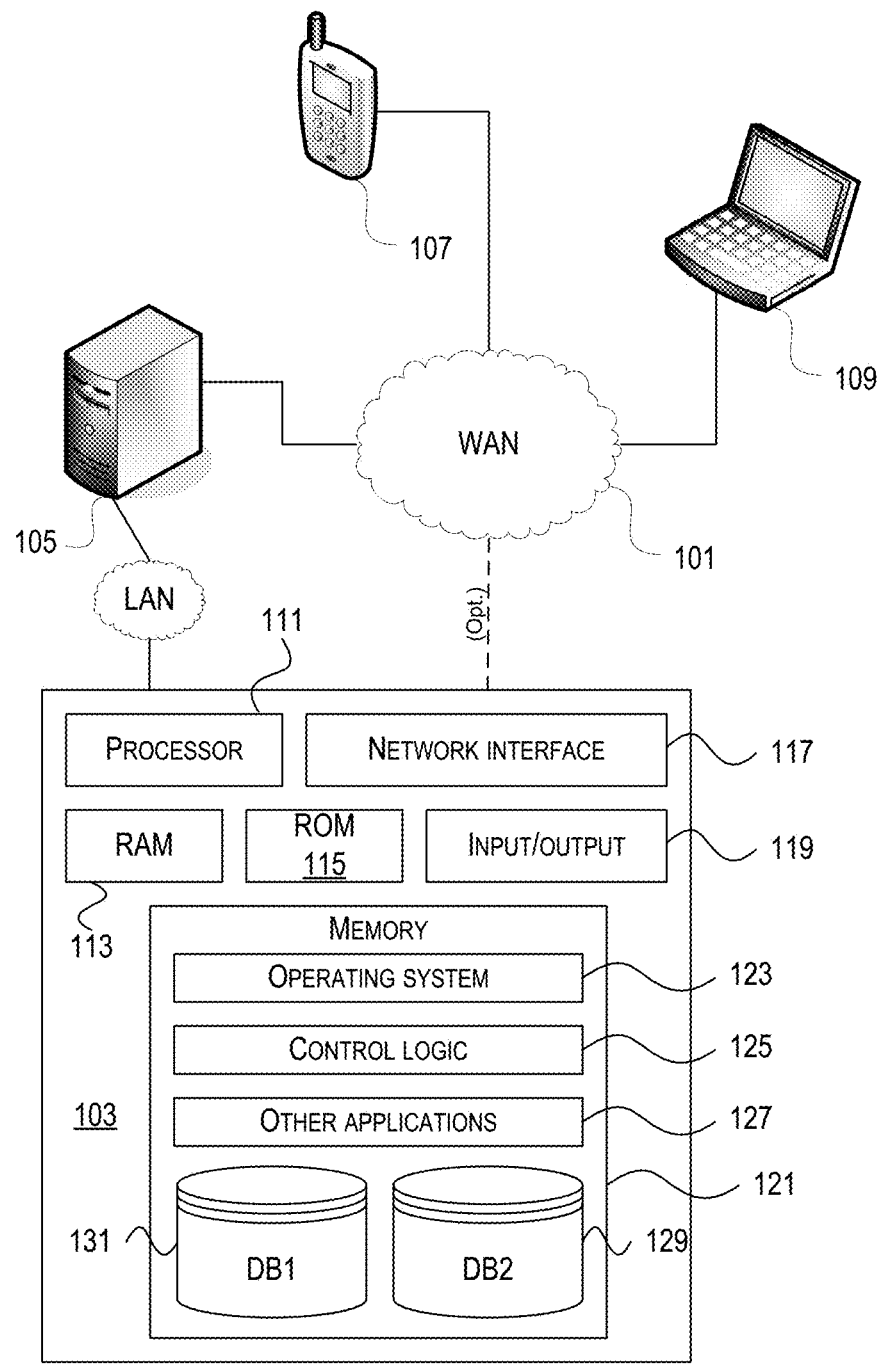
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards generating mobile VPN connections from mobile enterprise applications executing on a mobile device to a private enterprise network through the public network connection available to the mobile device. Unlike conventional device level VPN connections that intercept all outbound traffic from a device, the mobile VPN connections described herein may intercepts and tunnels traffic for only managed applications. A mobile device management (MDM) profile or Mobile Application Management (MAM) policy specifies which mobile applications installed on the mobile device are suitable for generating a mobile VPN connection to the private enterprise network. Once generated, the mobile VPN connection, hereinafter also referred to as microVPN, and/or micro VPN, only tunnels traffic from one or more specified enterprise mobile application to the private enterprise network. Traffic from other mobile applications is not intercepted nor tunneled through the mobile VPN generated for the enterprise mobile application. Multiple mobile VPN connections may simultaneously operate on a mobile device that has multiple mobile enterprise applications with each mobile VPN connection tunneling data for its respective enterprise mobile application according to a specific communication protocol. Throughout the disclosure, different implementations of generating such per application mobile VPNs are described. Different mobile applications may communicate data using different data transport/communication protocols such as transmission control protocol (TCP), user datagram protocol (UDP), and domain name system (DNS) addressing protocols. The system architecture and method for generating a microVPN may differ depending to each of these data transport protocols.

Current VPN systems intercept traffic from all applications executing on device (e.g., mobile device) through a single device level VPN connection. In such traditional VPN systems, packets are intercepted from non-enterprise applications that do not require packets to be intercepted as well as the enterprise applications. In addition, current VPN systems use a system level daemon to intercept all packets from both managed and unmanaged applications. Such continuous packet interception by a system level daemon causes battery drain. However, the mobile VPN implementations described herein intercept low level system calls from managed applications, system calls exchanged between managed applications and third party libraries, and any system calls issued by third party libraries that the enterprise mobile applications reference in order to ensure that all application traffic (both direct and indirect) is tunneled through to the destination.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
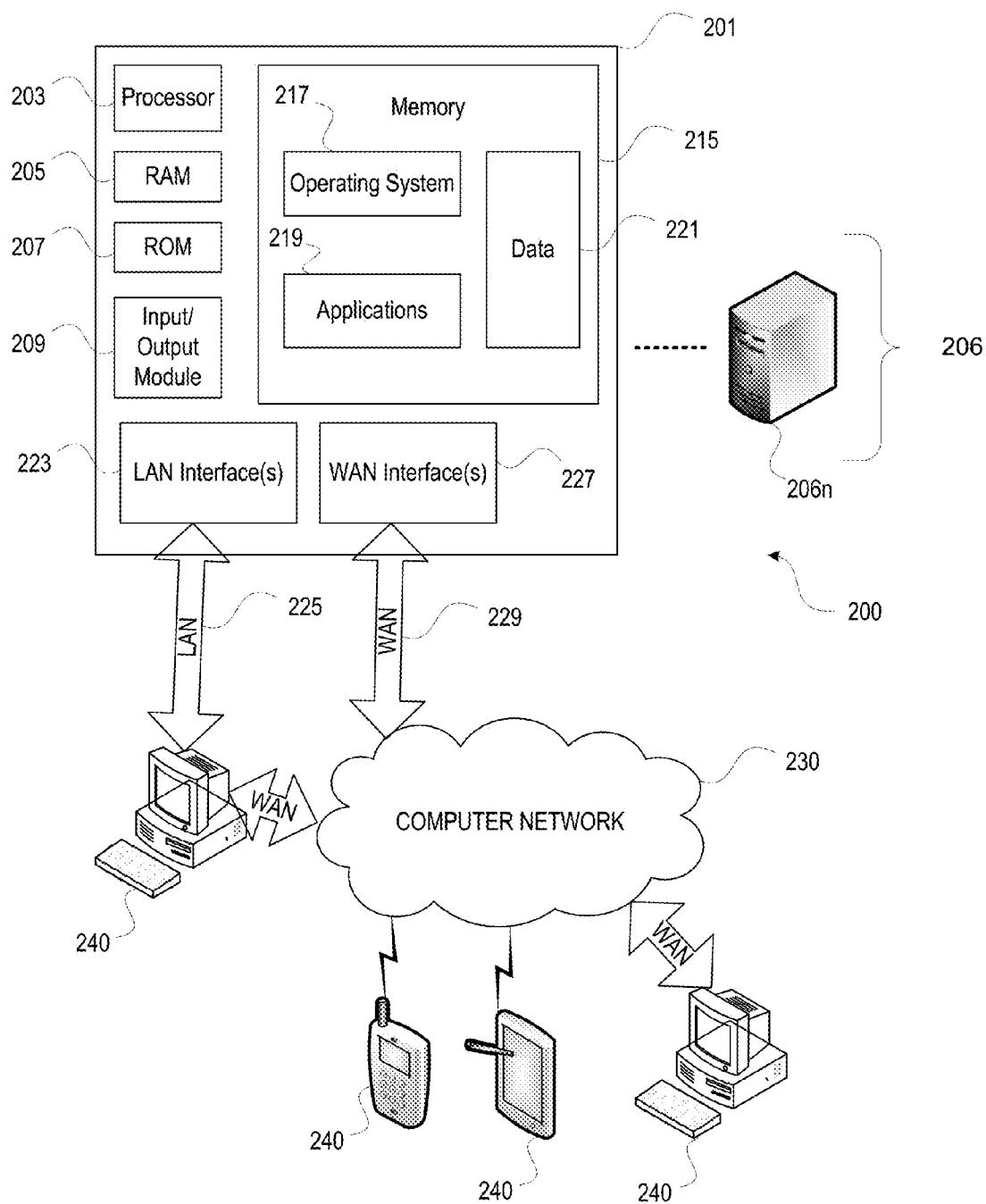
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be a mobile computing device configured to provide access to managed applications to its users in a secure environment. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 as well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

The first and the second mobility application shows are the first and

Enterprise Mobility Management Architecture

Figure 3:
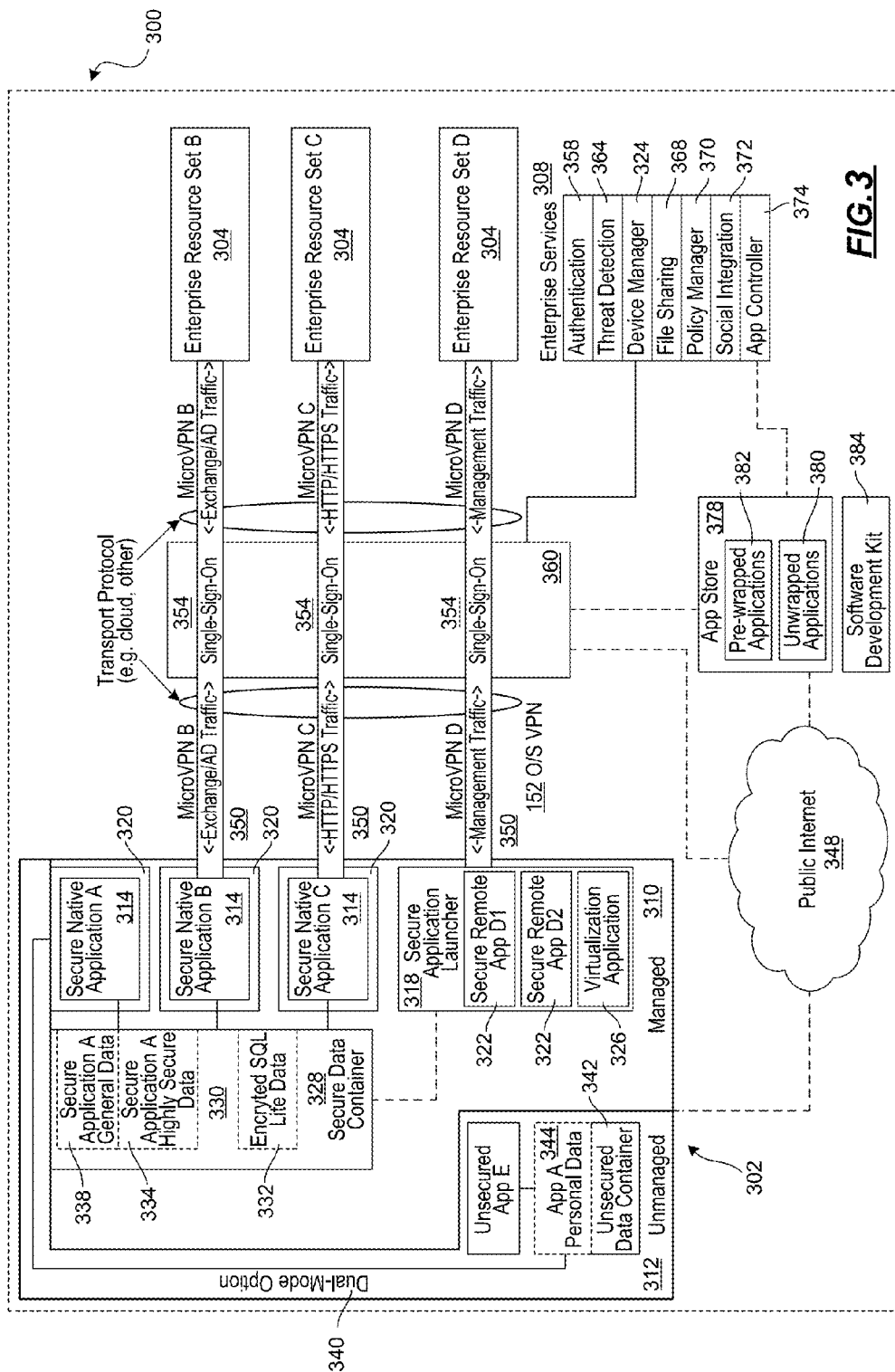
FIG. 3 depicts an illustrative enterprise mobility management system in accordance with one or more illustrative aspects described herein.

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, and engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
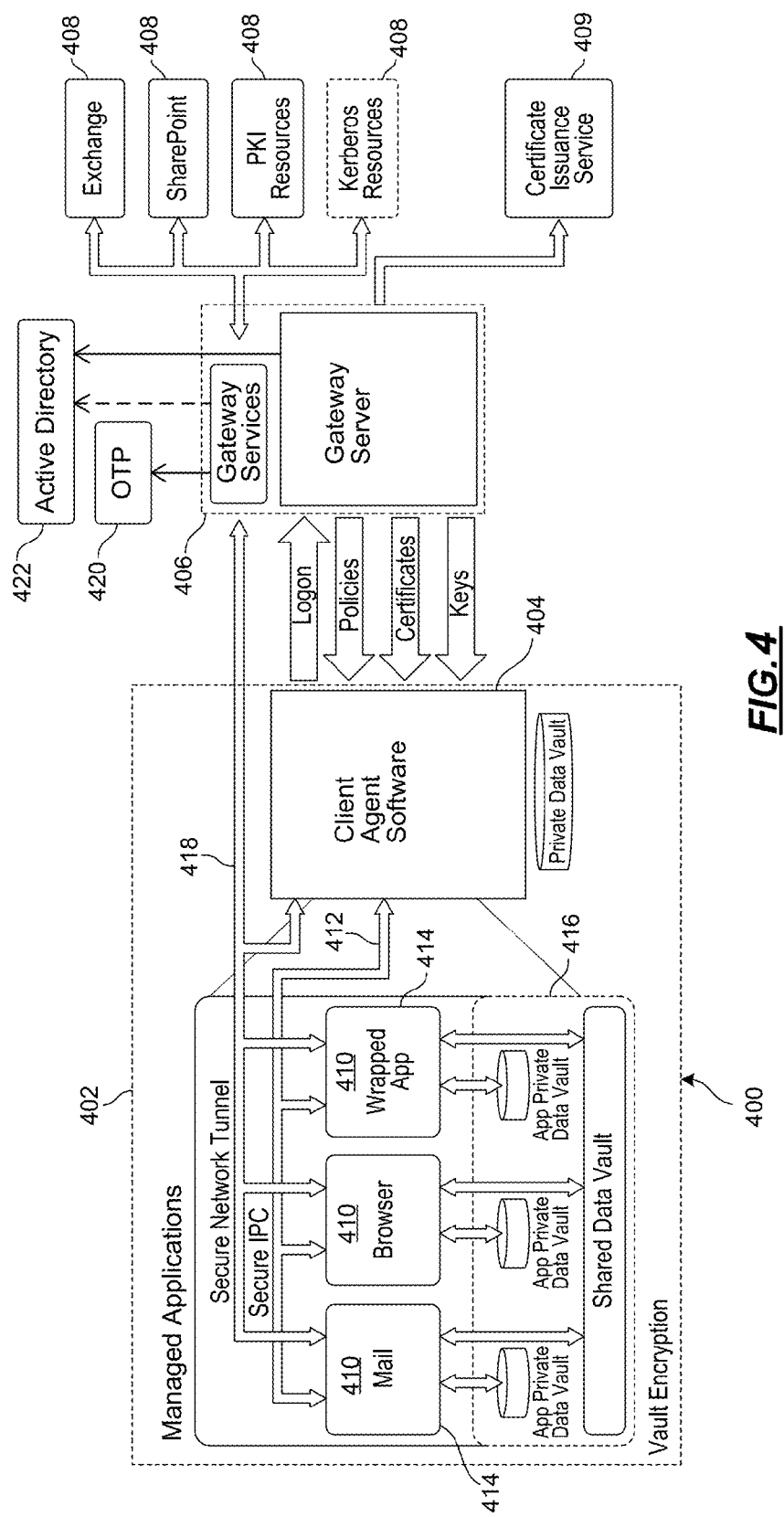
FIG. 4 depicts another illustrative enterprise mobility management system in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled mobile device 402 with a client agent 404, which interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PM protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PM protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PM protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to tunneling application network traffic for each mobile application through an application specific VPN server to the private network. The application specific VPN server may manage the VPN connection(s) for only one given mobile application and may intercept system calls issued by its respective mobile application to tunnel all relevant network traffic to the private network.

Mobile VPN Tunneling

Figure 5:
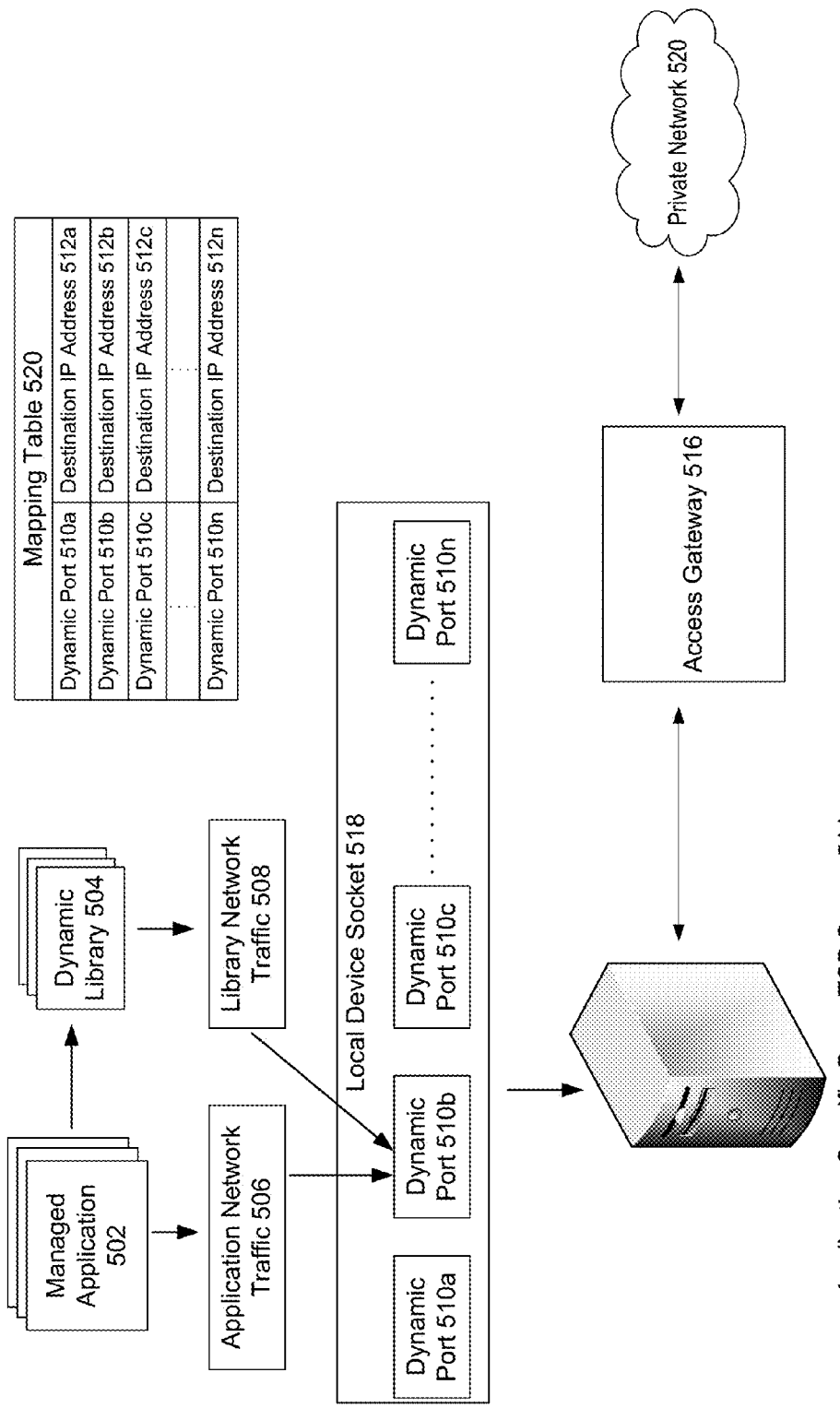
FIG. 5 depicts an illustrative mobile application VPN system that manages a mobile VPN using TCP tunneling protocols, in accordance with one or more illustrative aspects described herein.

FIG. 5 depicts an illustrative mobile VPN system 500 that manages a mobile VPN connection using TCP tunneling protocols. According to the embodiment depicted in FIG. 5, an enterprise mobile application that is managed by an MDM system may access enterprise resources via a secure VPN connection to the private network. For example, managed application 502 may connect to an access gateway 516 over a public network, for example, using a microVPN, and may access a secure portal through the access gateway 516 that might not be accessible by unsecured and/or unmanaged mobile applications, such as mobile applications that are not managed by an MDM system such as enterprise mobility management system 400 of FIG. 4.

In some embodiments, the mobile VPN system 500 may manage inbound and outbound traffic from managed application 502. The mobile device on which the managed application 502 is executing (e.g., mobile device 402 of FIG. 4) may monitor whether the managed application 502 requests to communicate with a private network 520 that cannot be accessed by devices having access to a public network 520. For example, the private network 520 may be separate from the public network (e.g., Internet) by a firewall that only enterprise applications with access may be able to access through a virtual private network connection. The mobile device of managed application 502 may be connected to the public network. Unmanaged mobile applications executing on the mobile device may access the public network. Managed application 520 may also access the public network. In order to access the private network 520, the managed application 520 may need to establish a VPN connection to the private network 520 through the public network. For example, the managed application may issue a request to set up a VPN connection to an access gateway 516 through a port of the mobile device that may forward the managed application 502's outbound traffic to the private network 520. Additionally or alternatively, the access gateway 516 may also transmit communications from the private network 520 destined for the managed application 502 and transmit it back to the managed application 502.

Figure 6:
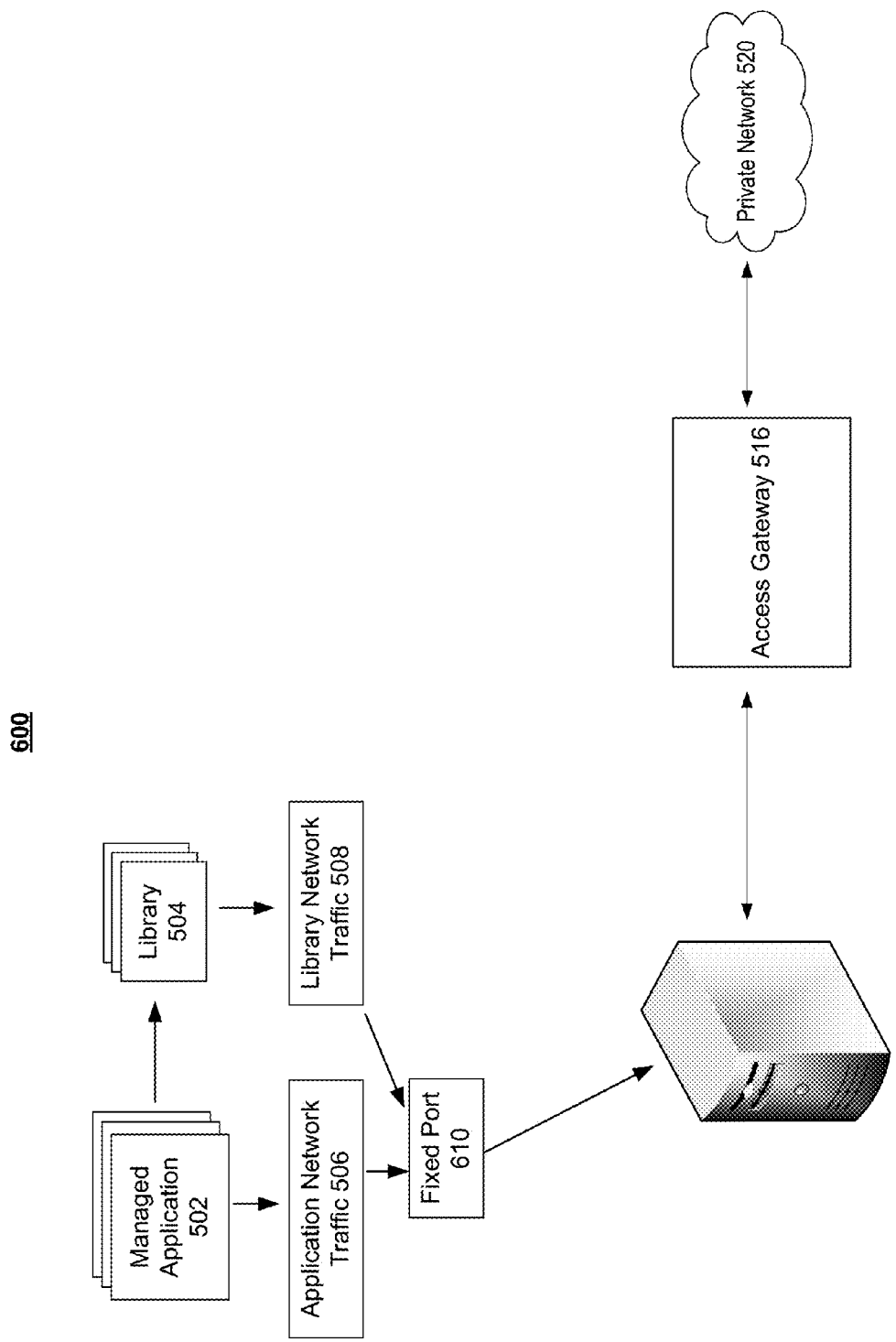
FIG. 6 depicts an illustrative mobile application VPN system that manages a mobile VPN using UDP tunneling protocols, in accordance with one or more illustrative aspects described herein.
Figure 7:
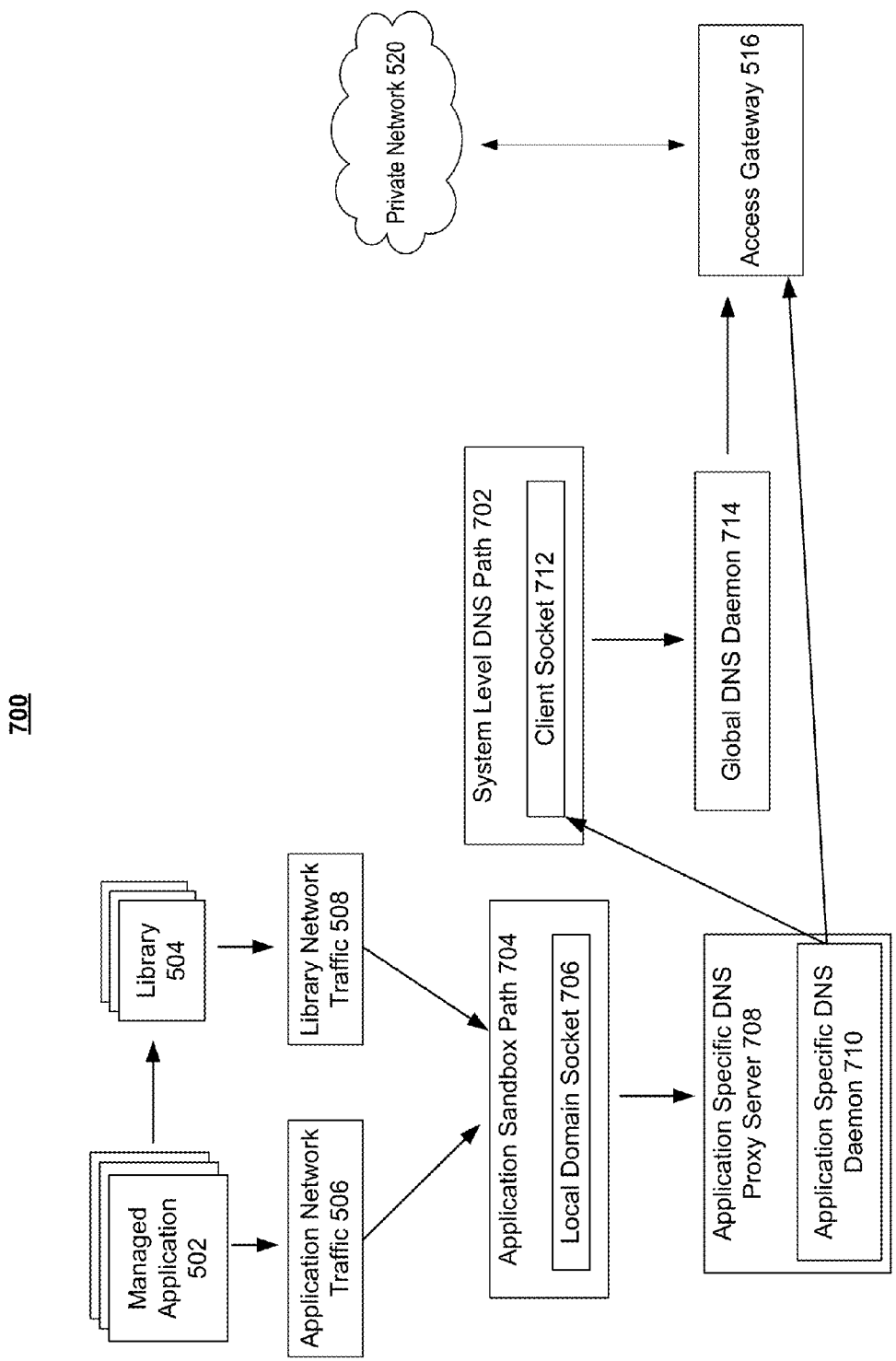
FIG. 7 depicts an illustrative mobile application VPN system that manages a mobile VPN using DNS tunneling protocols, in accordance with one or more illustrative aspects described herein.

The managed application 502 may communicate with the private network 520 using several different communication protocols. For example, the managed application 502 may establish a tunneling connection and/or a virtual private network connection with the private network 520 using different tunneling and/or communication protocols. The system architecture of the mobile VPN system used to establish a VPN connection between the managed application 502 and the private network 520 may vary depending on the type of tunneling and/or communication protocol supported by the managed application 502. For each managed application 502 that is to communicate with a private network 520 over a VPN connection, the mobile device may determine the type of tunneling protocol to use. Upon determining the tunneling protocol, the mobile device may accordingly determine how to process the application network traffic 506 and/or the library network traffic 508 that is to be tunneled over the VPN connection. The embodiment depicted in FIG. 5 depicts the mobile VPN system 500 used to facilitate TCP private network connections and other private network connections that rely on similar network architecture as TCP tunneling protocols. FIG. 6 depicts the mobile VPN system 600 used to facilitate UDP private network connections and other private network connections that rely on similar network architecture as UDP tunneling protocols. FIG. 7 depicts the mobile VPN system 600 used to facilitate DNS private network connections and other private network connections that rely on similar network architecture as DNS tunneling protocols. UDP private network connections and DNS private network connections are described in greater detail in FIGS. 6 and 7 below, respectively.

In some embodiments, the mobile device and/or the managed application 502 intercepts all system calls made by the managed application 502 and any related dynamic libraries 504 that the managed application 502 communicates with. In order to intercept all application network traffic 506 and library network traffic 508 that dynamic libraries 504 called upon by the managed application 502 produce, all system calls made by the managed application 502 and associated dynamic libraries 504 may be intercepted. Instead of intercepting high level application traffic unlike conventional systems, the mobile VPN system 500 may intercept the lowest level of application traffic (e.g., system calls). By intercepting all system calls that the managed application 502 and its associated libraries make to the operating system of the mobile device, the mobile device may be able to identify all system calls to initiate a connection on a local device socket 518. For example, the mobile device may identify all system calls, such as connect( ) and connectx( ), to initiate a tunnel and/or virtual private network connection to the private virtual network 520 on local device socket 518 of the mobile device. By identifying all such instances of a socket connection on the mobile device made by the managed application 502 and its related dynamic libraries 504, the mobile device may ensure that it has intercepted all requests and/or attempts by the managed application 502 to communicate with the private virtual network 520 and/or to tunnel application network traffic 506 and library network traffic 508 through the virtual private network connection. The application network traffic 506 and/or the library network 506 may include such system calls to connect to the VPN along with messages containing traffic payload to communicate to the private network 520. By intercepting the system calls to connect to the VPN (e.g., in this example the connect( ) and connectx( ) system calls) that are present in the application network traffic and/or the library network traffic 508, the mobile device may intercept all VPN traffic from the managed application 502. Although connect( ) and connectx( ) are used as examples in this disclosure, the mobile device may monitor the system calls in application network traffic 506 and library network traffic 508 for all system calls known to be made by various different types of mobile operating systems (e.g., iOS, Android, Firefox OS, Windows Phone OS, Blackberry OS, Tizen OS, Ubuntu Touch OS, etc.).

In some embodiments, once the system calls to connect to a VPN are intercepted, the application network traffic 506 and/or library network traffic 508 that use such system calls are redirected to a dynamic port. The mobile device may generate a dynamic port on which a TCP connection is to be established from the mobile device to tunnel the application network traffic 506 and/or the library network traffic 508 associated with the intercepted VPN system call to the private network 520. The mobile device may generate multiple different dynamic ports 510*a-n* on a local device socket 518. Each mobile device may have multiple managed mobile applications such as managed application 502 that request to communicate with private network 520. For each managed application 502, the mobile device may allocate one or more dynamic ports 510*a*-510*c* from all of the dynamic ports 510*a-n* on the mobile device. A dynamic port may be assigned to specific types of application network traffic 506 and/or library network traffic 508 by determining the destination network address of the traffic. The mobile device may consult a mapping table 520 to determine which dynamic port to assign the one or more messages (e.g., application network traffic 506 and/or library network traffic 508) based on the destination network address of the one or more messages. The mapping table 520 may comprise a mapping of all the dynamic ports 510*a*-510*n* of the mobile device with different destination network addresses 512*a-n*. As new requests for different destination network addresses are received from intercepted system calls, the mobile device may generate new dynamic ports in the local device socket 518 of the mobile device to route traffic to such destination network addresses and update the mapping table 520 to note the association between the newly generated dynamic port and the corresponding destination network address in the private network 520 that the newly generated dynamic port is created to tunnel traffic to.

In some embodiments, an application specific proxy TCP server 514 is generated at each dynamic port to handle routing the traffic to the private network. At each dynamic port, a connection from the dynamic port at the local device socket 518 is generated to connect the dynamic port to a proxy TCP server 514 to handle routing the traffic messages for each TCP VPN connection to the private network 520. The proxy server 514 may use an online web server to create a proxy through which to tunnel the application network traffic 506 from the managed mobile application 502 to the private network 520. The proxy server 514 may be an application specific server and only handle application network traffic for the mobile application that it is configured to serve. Additionally or alternatively, each TCP connection and/or TCP tunnel that is generated at a dynamic port of the mobile device may be dedicated to serve only one managed application 502. The VPN connection may therefore be an application specific VPN that only tunnels the application network traffic for only one managed mobile application.

In some embodiments, the mobile VPN system 500 may set up and maintain one or more TCP tunneling connections for each managed application 502. Once a TCP connection to the access gateway 516 has been established, application network traffic and/or system calls that specify a destination network address that is already noted in the mapping table 520 and corresponds to an already generated dynamic port in the local device socket 518 may be routed to the dynamic port corresponding to the destination network address according to such an association specified in mapping table 520. Once TCP connections have been created (e.g., a socket connection to an application specific TCP proxy server 514 has been generated at the dynamic port 510*b* in the local device socket 518 and the proxy server 514 has opened a socket to the access gateway 516), the TCP connection between (e.g., VPN tunnel) from the dynamic port 510*b* to the access gateway 516 may be actively maintained by the mobile VPN system 500. For example, TCP acknowledgement messages and other network management messages may be exchanged between the access gateway 516 and the dynamic port corresponding to the TCP connection to monitor the status, bandwidth usage, and security of the TCP connection. The TCP connection may be used when any future application network traffic that requires use of that TCP connection.

In some embodiments, the MDM profile (or MAM policy) on each mobile device may maintain a list of enterprise managed applications that require a VPN connection with the private network 520. The managed mobile application 502's source code may include programming and/or instructions to generate a TCP microVPN connection dedicated to tunnel only the managed application 502's traffic to the private network 520. In some embodiments, when the managed application 502 is launched on the mobile device, the mobile device 502 may initiate multiple different microVPN connections on multiple different dynamic ports (e.g., dynamic ports 510a-c) of the mobile device for the various different destination network addresses with which the managed application 502 is configured to communicate. The mobile device may note the association between the destination network addresses 512a-c and the dynamic ports 510a-c and the corresponding application specific TCP proxy servers 514 on these dynamic ports. Once the managed application 502 has launched, as the managed application 502 generates application network traffic 506 and/or library network traffic 508 for additional destination network addresses, the mobile device may generate additional dynamic ports on the local device socket 518 of the mobile device, create socket connections to additional dedicated proxy servers to tunnel traffic through to the requested new destination addresses, and update the mapping table 520 to note the association between the new destination network addresses and the newly allocated dynamic ports.

In some embodiments, multiple different VPN connections may exist for the same mobile application. Multiple different dynamic ports and their associated proxy servers may exist to service application network traffic for the same mobile application. Each dynamic port and proxy server 514 running on that dynamic port may handle application network traffic for a given TCP connection for a managed mobile application. Since a mobile device may include more than one managed application, multiple different sets of dynamic ports and TCP proxy servers may concurrently set up TCP tunnels for these different managed applications executing on the mobile device to tunnel traffic to the private network 520.

In some embodiments, once application network traffic 506 and/or the library network traffic 508 reaches a dynamic port on the local device socket 518, the payload of such network traffic from the managed application 502 may be transferred to the proxy server 514 at the dynamic port. For example, as shown in the example embodiment of FIG. 5, application network traffic 506 from the managed application 506 may include the destination network address of a destination IP address 512b. By identifying that destination IP address 512b is associated with dynamic port 510b, the application network traffic associated with the system calls to connect to destination IP address 512b may be routed to dynamic port 510b. A socket connection may be created from the local device socket 518 at dynamic port 510b to connect to an application specific proxy TCP server 514. The application specific proxy TCP server 514 may be a microVPN server. The application specific proxy TCP server 514 may generate a socket connection to the access gateway 516 which may handle routing traffic from the public network accessible to the mobile device to the private network 520. At the application specific proxy TCP server 514, application network traffic 506 from the managed application 502 may be repacketized to be tunneled to the private network 520 via the access gateway 516. For example, the payload of the application network traffic 506 may be extracted and formatted according to the TCP protocol used by the TCP connection to the private network 520. The access gateway 516 may require incoming payload packets to be repacketized according to the tunneling protocol to be sent to the private network 520. Accordingly, the application specific proxy TCP server 514 may identify the protocols used by the access gateway 516 and/or the private network 520 and repacketize incoming application network traffic 506 packets to be correctly formatted for transmission to the private network 520.

According to the mobile VPN system 500, once system calls specifying a destination network address have been intercepted from a managed mobile application 502, an application specific TCP VPN tunnel may generated to tunnel the application network traffic 506 and/or the library network traffic 508 associated with the intercepted system call to connect to a VPN tunnel. Upon interception of a VPN connection system call specifying a destination network address, the mobile VPN system 500 may be able to automatically generate and allocate a dynamic port in the local device socket 518 to tunnel the application network traffic associated with the VPN connection system call, generate an application specific proxy TCP server 514 on an allocated dynamic port corresponding to the destination network address of the VPN connection system call, generate a socket connection to the access gateway 516 to tunnel that application network traffic, and handle repacketization of the network traffic at the application specific proxy TCP server 514 to tunnel that traffic to the access gateway 516.

FIG. 6 depicts an illustrative mobile VPN system 600 that manages a mobile VPN using UDP tunneling protocols. The system architecture of mobile VPN system 600, although similar to that of mobile VPN system 500, also differs in key characteristics from that of mobile VPN system 500. Upon determining that the managed application 502 communicates using UDP protocols and/or upon determining that the access gateway 516 requires a UDP tunneling connection, the managed application 502 uses mobile VPN system 600 to create a UDP tunneling connection to the private network 520 via access gateway 516. Since UDP is a connectionless protocol unlike TCP, no active UDP connection needs to be maintained by the mobile device with the access gateway 516, unlike that in the TCP mobile VPN system 500. Additionally, a UDP VPN connection is established between the mobile device and the access gateway 516 through a fixed port (e.g., fixed port 610) on the mobile device instead of dynamic ports as in TCP mobile VPN system 500. Furthermore, since UDP is a connectionless protocol and only one fixed port is used to tunnel each mobile application's traffic to the private network 520, only one proxy VPN server is used per mobile application to tunnel traffic to the private network 520 via the access gateway 516.

In some embodiments, once the mobile device determines that the managed application 502 uses a UDP communication protocol, UDP system calls made by the managed application 502 to connect to a VPN may be intercepted. By intercepting all system calls that the managed application 502 and its associated libraries make to the operating system of the mobile device, the mobile device may be able to identify all system calls to initiate a connection on a socket.

For example, the mobile device may identify all UDP system calls, such as connect( ) and sendto( ), to initiate a tunnel and/or virtual private network connection to the private virtual network 520 on a device socket of the mobile device. By identifying all such instances of a socket connection on the mobile device made by the managed application 502 and its related dynamic libraries 504, the mobile device may ensure that it has intercepted all requests and/or attempts by the managed application 502 to communicate with the private virtual network 520 and/or to tunnel application network traffic 506 and library network traffic 508 through the virtual private network connection. The application network traffic 506 and/or the library network 506 may include such system calls to connect to the VPN along with messages containing traffic payload to communicate to the private network 520. By intercepting the UDP system calls to connect to the VPN (e.g., in this example the connect( ) and sendto( ) system calls) that are present in the application network traffic and/or the library network traffic 508, the mobile device may intercept all VPN traffic from the managed application 502. Although connect( ) and sendto( ) are used as examples in this disclosure, the mobile device may monitor the system calls in application network traffic 506 and library network traffic 508 for all UDP system calls known to be made by various different types of mobile operating systems (e.g., iOS, Android, Firefox OS, Windows Phone OS, Blackberry OS, Tizen OS, Ubuntu Touch OS, etc.).

In some embodiments, once the system calls to connect to a VPN are intercepted, the application network traffic 506 and/or library network traffic 508 that use such system calls for managed application 502 are redirected to a fixed port 610. The mobile device may allocated a fixed port on which a UDP VPN connection is to be established from the mobile device to tunnel the application network traffic 506 and/or the library network traffic 508 associated with the intercepted VPN system call to the private network 520. Each mobile device may have multiple managed mobile applications such as managed application 502 that request to communicate with private network 520. For each managed application 502, the mobile device may allocate one fixed port from all of the fixed ports on the mobile device. Since each UDP system call specifies the actual destination IP address that each application traffic packet is to be directed to, the mobile UDP VPN system 600 may direct the traffic associated with the system call directly to the destination through the access gateway 516 using the application specific proxy UDP server 614 on the fixed port 610. Once the VPN connection UDP system calls are intercepted, the mobile device may redirect such application network 506 and/or library network traffic 508 to the fixed port 610.

In some embodiments, an application specific proxy UDP server 614 is generated at the fixed port 610 to handle routing the traffic to the private network 520. At each fixed port such as fixed port 610 of the mobile device, a socket is generated to connect the fixed port to a proxy UDP server 614 to handle routing the traffic messages for each UDP VPN connection to the private network 520. The proxy server 614 may use an online web server to create a proxy through which to tunnel the application network traffic 506 from the managed mobile application 502 to the private network 520. The proxy server 614 may be an application specific server and only handle application network traffic for the mobile application that it is configured to serve. Additionally or alternatively, each UDP connection and/or UDP tunnel that is generated at a fixed port of the mobile device may be dedicated to serve only one managed application 502. The VPN connection may therefore be an application specific VPN that only tunnels the application network traffic for only one managed mobile application.

In some embodiments, when the managed application 502 intercepts application traffic and/or system calls with a UDP connection request, the mobile device 502 may initiate one microVPN connection on fixed port 610 of the mobile device. Since a mobile device may include more than one managed application, multiple different fixed ports and UDP proxy servers may concurrently set up one UDP tunnel for each of these different managed applications executing on the mobile device to tunnel traffic to the private network 520.

In some embodiments, once application network traffic 506 and/or the library network traffic 508 reaches a fixed port 610, the payload of such network traffic from the managed application 502 may be transferred to the UDP VPN proxy server 614 at the fixed port 610. A socket may be created at dynamic port 610 to connect to an application specific proxy UDP server 614. The application specific proxy UDP server 614 may be a microVPN server. The application specific proxy UDP server 614 may generate a socket to the access gateway 516 which may handle routing traffic from the public network accessible to the mobile device to the private network 520. At the application specific proxy UDP server 614, application network traffic 506 from the managed application 502 may be repacketized to be tunneled to the private network 520 via the access gateway 516. For example, the payload of the application network traffic 506 may be extracted and formatted according to the UDP protocol used by the UDP connection to the private network 520. The access gateway 516 may require incoming payload packets to be repacketized according to the tunneling protocol to be sent to the private network 520. Accordingly, the application specific proxy UDP server 614 may identify the protocols used by the access gateway 516 and/or the private network 520 and repacketize incoming application network traffic 506 packets to be correctly formatted for transmission to the private network 520.

According to the mobile VPN system 500, once system calls specifying a destination network address have been intercepted from a managed mobile application 502, an application specific UDP VPN tunnel may generated to tunnel the application network traffic 506 and/or the library network traffic 508 associated with the intercepted system call to connect to a VPN tunnel. Upon interception of a VPN connection system call specifying a destination network address, the mobile VPN system 600 may be able to automatically allocate a fixed port to tunnel the application network traffic associated with the VPN connection system call, generate an application specific proxy UDP server 614 on the allocated port corresponding to managed application, generate a socket to the access gateway 516 to tunnel that application network traffic, and handle repacketization of the network traffic at the application specific proxy UDP server 614 to tunnel that traffic to the access gateway 516.

In some embodiments, the mobile VPN system 600 may redirect the application network traffic 506 and/or library network traffic 508 directed to the private network 520 directly from the VPN connection system calls. For example, the mobile VPN system 600 may extract the actual destination IP address found in the UDP VPN connection system calls (e.g., the connect( ) and sendto( ) UDP system calls) and redirect such traffic directly to the application specific proxy UDP server 614 on fixed port 610. Because the UDP VPN connection system calls already includes the destination IP address, no redirection is needed to a dynamic port unlike TCP system calls to resolve an actual destination IP address. The application specific proxy UDP server 614 may be able to format the UDP traffic to the private network 520 via the access gateway 516. Once the application traffic has been transmitted to the private network 520, no active UDP connection may be maintained between the managed application 502 and the access gateway 516 and/or the private network 520.

FIG. 7 depicts an illustrative mobile VPN system 700 that manages a mobile VPN using DNS tunneling protocols. According to the embodiment depicted in FIG. 7, managed application 502 may connect to an access gateway 516 over a public network, for example, using a microVPN, and may access a secure portal through the access gateway 516.

In some embodiments, the mobile device and/or the managed application 502 intercepts all system calls made by the managed application 502 and any related dynamic libraries 504 that the managed application 502 communicates with. The mobile VPN system 700 may determine that the managed application 502 uses a DNS tunneling protocol and/or a DNS communication protocol to connect to the private network 520. In response to determining that the managed application 502 uses a DNS protocol, the mobile VPN system may monitor all DNS system calls to connect to the VPN. In traditional DNS VPN systems, there may be a global (e.g., system level) DNS daemon 714 that receives all DNS queries from the managed application 502, its related dynamic libraries 504, and other mobile applications executing on the mobile device. In conventional systems, each DNS query from all mobile applications is addressed to the global DNS daemon 714. However, in the present disclosure, systems and methods to generate an application specific DNS server 708 that handles only the DNS traffic for a single mobile application are described.

In some embodiments, the mobile VPN system 700 may intercept all system calls issued by the managed application 502 and its related dynamic libraries 504 in order to intercept all system calls to connect to a VPN. The DNS VPN system calls made by the managed application 502 and/or the dynamic library 504 may include a path to the global DNS daemon 714 for DNS resolution of a DNS query associated with the system call. DNS daemons such as the global DNS daemon 714 and the application specific DNS daemon 710 may be configured to resolve DNS queries from the managed application 502 and dynamic library 504 and direct the application network traffic 506 and library network traffic 508 associated with such system calls.

In some embodiments, once the mobile VPN system 700 intercepts DNS system calls issued by the managed application 502 and/or dynamic library 504 to connect to and/or communicate with a private network 520, the mobile VPN system may redirect the application network traffic 506 and/or the library network traffic 508 associated with such DNS system calls to an application specific DNS daemon 710. For each managed mobile application 502, the mobile VPN system 700 may generate a local domain socket 706 at an application sandbox path 704. The mobile VPN system 700 may generate an application specific DNS proxy server 708 at the application sandbox path 704 that is communicatively coupled to the local domain socket 706. The application specific DNS proxy server 708 may comprise the application specific DNS daemon 710 which may be used to handle routing the application network traffic 506 and/or the library network traffic to the private network 520. For example, the application specific DNS daemon 710 may perform DNS resolution on the DNS queries in the redirected application network traffic 506 and/or the library network traffic 508 to direct such traffic to an access gateway 516 through public network 716 (e.g., Internet) for forwarding to the private network 520 and/or to the global DNS daemon 714 for further DNS resolution.

In some embodiments, the mobile VPN system 700 may replace and/or rewrite the DNS path included in each DNS VPN connection system call with the application sandbox path 704 at which the application specific DNS proxy server 708 is located. By redirecting the application network traffic 506 and library network 508 associated with each DNS VPN connection system call issued by a managed application 502 to a local domain socket 706 at the application sandbox path 704, the mobile VPN system 700 may redirect application traffic for each mobile application to a unique sandbox path that an external user/process cannot track and/or detect for malicious purposes (e.g., to hack into the DNS daemon to redirect traffic). The mobile VPN system 700 may generate the local domain socket 706 to connect to the application specific DNS proxy server 708 to handle routing the traffic messages for the managed application 502 to the private network 520. The proxy server 708 may use an online web server to create a proxy through which to tunnel the application network traffic 506 from the managed mobile application 502 to the private network 520. The proxy server 708 may be an application specific server and only handle application network traffic for the mobile application that it is configured to serve. Additionally or alternatively, each DNS connection and/or DNS tunnel that is generated at the local domain socket 706 may be dedicated to serve only one managed application 502. The VPN connection may therefore be an application specific VPN that only tunnels the application network traffic for only one managed mobile application.

In some embodiments, the MDM profile on each mobile device may maintain a list of enterprise managed applications that require a VPN connection with the private network 520. The managed mobile application 502's source code may include programming and/or instructions to generate a DNS microVPN connection dedicated to tunnel only the managed application 502's traffic to the private network 520 upon receipt of a DNS VPN connection system call issued from the managed application 502.

In some embodiments, multiple different managed applications may be executing on the same mobile device and may require DNS tunnels to the private network 520. Since a mobile device may include more than one managed application, multiple different sets of local domain sockets and application specific DNS proxy servers may concurrently set up DNS traffic forwarding for these different managed applications executing on the mobile device to tunnel traffic to the private network 520.

In some embodiments, once application network traffic 506 and/or the library network traffic 508 reaches the local domain socket 706 at the application sandbox path 704 upon successful redirection, the payload of such network traffic from the managed application 502 may be transferred to the application specific DNS proxy server 708 through the local domain socket 708. For example, as shown in the example embodiment of FIG. 5, application network traffic 506 from the managed application 506 may include a DNS query specifying a domain name at the private network 520. The application specific DNS proxy server 708 may process the DNS query within such network traffic and identify the destination network address of the network traffic. The application specific DNS proxy server 708 may be a microVPN server. The application specific DNS proxy server 708 may generate a socket to the access gateway 516 which may handle routing traffic from the public network accessible to the mobile device to the private network 520. At the application specific DNS proxy server 708, application network traffic 506 from the managed application 502 may be repacketized to be tunneled to the private network 520 via the access gateway 516. For example, the payload of the application network traffic 506 may be extracted and formatted according to the DNS protocol used by the DNS connection to the private network 520. The application specific DNS proxy server 708 may transmit these formatted payload(s) of the application network traffic 506 to the access gateway 516 through via the public network 716. For example, the application specific DNS proxy server 708 may directly communicate with the public network 716 through which the access gateway 516 may be accessed. Accordingly, the application specific DNS proxy server 708 may format the payload(s) of the application network traffic 506 to be transmitted to the access gateway 516 through the public network 716. The access gateway 516 may require incoming payload packets to be repacketized according to the tunneling protocol to be sent to the private network 520. Accordingly, the application specific DNS proxy server 708 may identify the protocols used by the access gateway 516 and/or the private network 520 and repacketize incoming application network traffic 506 packets to be correctly formatted for transmission to the private network 520.

In some embodiments, the application specific DNS daemon 710 may direct the application network traffic 506 and/or the library network traffic 508 to a global DNS daemon for further DNS resolution and/or processing. The application specific DNS daemon 710 may process the application network traffic 506 and/or the library network traffic 508's associated DNS queries using policies used by the access gateway 516 and/or the mobile VPN system 700. For example, the application specific DNS daemon 710 may determine whether the DNS requests and/or the related application network traffic 506 and/or the library network traffic 508 received through the application sandbox path 704 for application 502 can be resolved locally by the application specific DNS daemon 710. DNS requests that require further reformatting according to the access gateway 516's policies that cannot be performed at application specific DNS daemon 710 may be forwarded to the global DNS daemon 714. The application specific DNS daemon 710 may redirect the application network traffic 506 and/or the library network traffic 508 that it has received from local domain socket 706 to the system level DNS path 702 at which a client socket 712 may exist to connect to the global DNS daemon 714. The application specific DNS daemon 710 may replace the destination path in the DNS queries of the application network traffic 506 and/or the library network traffic 508 to that of the system level DNS path 702 to transmit the traffic to the client socket 712 at path 702. Once the application network traffic 506 and/or the library network traffic 508 reaches the client socket 712, the traffic may be received by the global DNS daemon 714 that is communicatively coupled to the client socket 712. The global DNS daemon 714 may process and/or reformat the application network traffic 506 and/or the library network traffic 508 according to the access gateway 516's policies to prepare such traffic for transmission to the private network 520 via access gateway 516. The global DNS daemon 714 may communicate with the access gateway indirectly through the public network 716. The global DNS daemon 714 may use DNS web servers configured on the mobile device to transmit network traffic to the access gateway 516 over the public network 716. The global DNS daemon 714 may directly communicate with the public network 716 through which the access gateway 516 may be accessed. Accordingly, the global DNS daemon 714 may instruct the DNS servers configured on the mobile device to format the payload(s) of the application network traffic 506 to be transmitted to the access gateway 516 through the public network 716.

The global DNS daemon 714 may resolve the DNS queries that the application specific DNS daemon 710 may not have performed on such redirected traffic packets. Upon processing the application network traffic 506 and/or the library network traffic 508, the global DNS daemon 714 may transmit them to access gateway 516.

FIG. 8 depicts a flowchart that illustrates a method of generating a mobile TCP VPN connection on a per application basis in accordance with one or more illustrative aspects described herein. In one or more embodiments, the method of FIG. 8 and/or one or more steps thereof may be performed by a computing device (e.g., generic computing device 201). In other embodiments, the method illustrated in FIG. 8 and/or one or more steps thereof may be embodied in computer-executable instructions that are stored in a computer-readable medium, such as a non-transitory computer-readable memory.

Figure 8A:
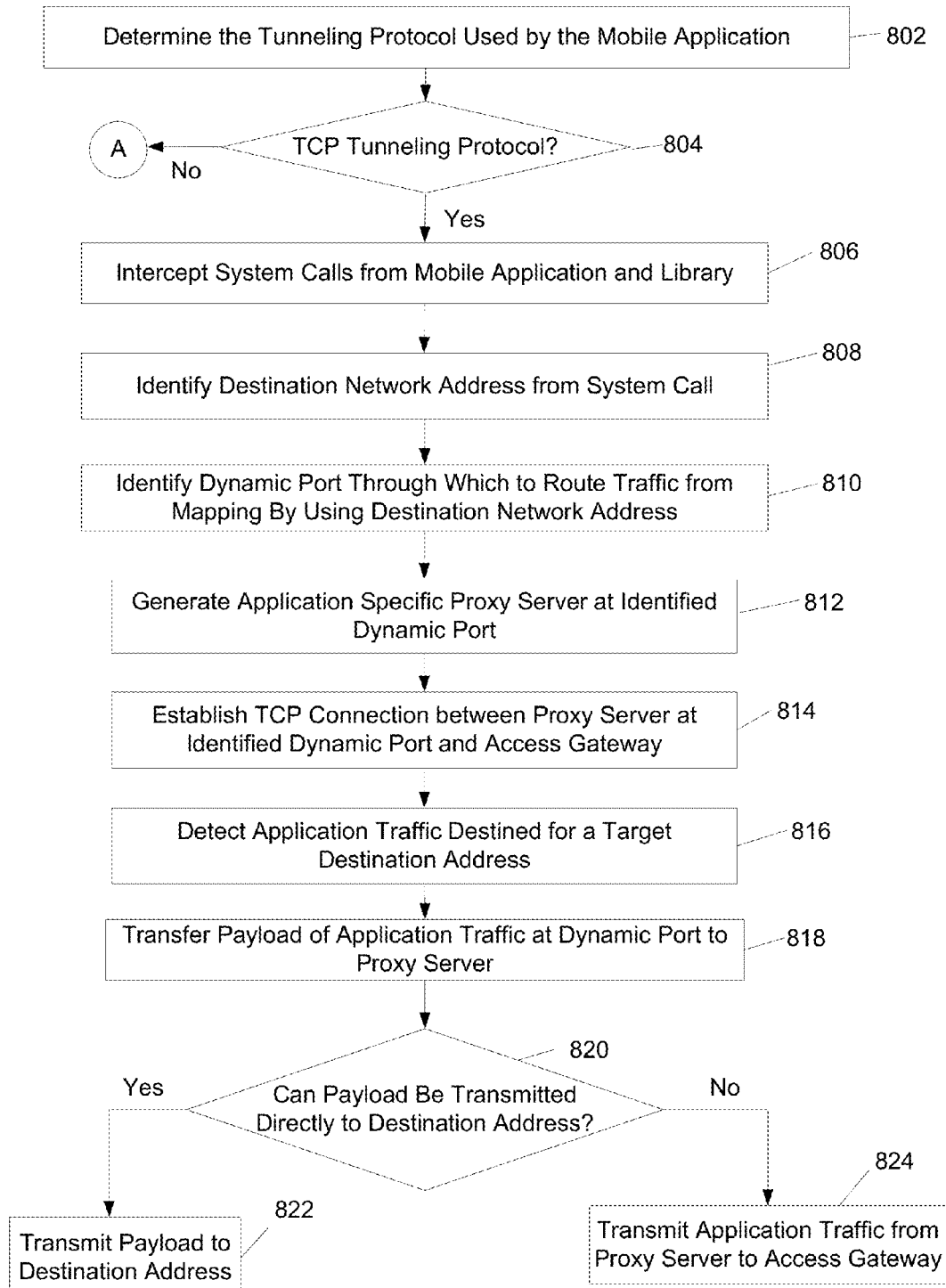
FIG. 8A depicts a flowchart that illustrates a method of generating a mobile TCP VPN connection on a per application basis in accordance with one or more illustrative aspects described herein.

As shown in FIG. 8A, the method may begin at step 802 in which a mobile device may determine the tunnel protocol used by a mobile application. For example, the mobile device may examine the source code and/or communication protocol of the mobile application to determine the communication protocol used by the mobile application to communicate with public networks and/or private networks. The mobile application may use the public network, to which it has access, to access the access gateway to create a VPN tunnel to the private network. Additionally or alternatively, the communication protocol and/or tunneling protocol of an access gateway used to access the private network from a public network may be examined to determine the type of communication protocol that the mobile application must use to communicate with the access gateway to set up a VPN connection.

At step 804, the mobile device may determine whether the mobile application uses a TCP tunneling protocol. The mobile device may determine whether the mobile VPN system uses a TCP tunneling protocol by monitoring whether the system calls and/or communication protocols examined in step 802 comprise indicators of a TCP communication and/or tunneling protocol being used. For example, the mobile device may examine the communications and/or system calls from the mobile application for known TCP system calls, communication processes, and/or hooks indicative of TCP communication protocols. Upon determining that the mobile application does not use a TCP tunneling protocol, the method may proceed to step 832 of FIG. 8B.

At step 806, upon determining that the mobile application uses a TCP tunneling protocol, the mobile device may intercept system calls from the mobile application and any third party libraries used by the mobile application. The mobile device may examine all system calls issued by the mobile application and/or its associated libraries for specific TCP system calls to connect to a VPN network (e.g., connect( ) and connect( )system calls). The mobile device may identify all the system calls to connect to the VPN network and may also identify all application network traffic and/or library network traffic associated with such intercepted system calls.

At step 808, the mobile device may identify a destination network from each intercept system call made by the mobile application and/or its associated third party library. For example, the VPN connection system calls and/or their associated traffic messages may include one or more destination network addresses and/or intermediate addresses. The mobile device may identify such network addresses included in the application traffic messages and/or system calls from the mobile application and/or its associated libraries to determine how to best route such application traffic. If a destination address is detected that has not been previously encountered by the mobile device for that particular application, a new dynamic port may be generated to serve the new destination network. In particular, the mobile device may generate a dynamic port and associate that dynamic port with the network address that it has been generated to route traffic to. The mobile device may update a mapping of dynamic ports of the mobile device and destination network addresses with the association of the newly generated dynamic port to its corresponding destination network address.

At step 810, the mobile device may identify a dynamic port through which to route traffic by using the destination network address. By consulting the mapping of dynamic ports to destination network addresses, the mobile device may identify which dynamic port should be used to route traffic from the mobile application and/or its associated dynamic libraries to the destination network address.

At step 812, the mobile device may generate an application specific proxy server at the identified dynamic port. At the dynamic port, a socket may be created to a proxy server configured to maintain a TCP connection for the managed application's traffic to the private network via the access gateway. For example, the proxy server may be generated to initiate and keep a TCP connection alive between the mobile device on the corresponding dynamic port and the access gateway through which application traffic to the private network must be directed. The application specific proxy server may be configured to intercept system calls made by the managed mobile application and select traffic destined for the network address that it is configured to serve. The application specific proxy server may generate a socket to the access gateway which may handle routing traffic from the public network accessible to the mobile device to the private network. At the application specific proxy server, application network traffic from the managed application may be repacketized to be tunneled to the private network via the access gateway. For example, the payload of the application network traffic may be extracted and formatted according to the TCP protocol used by the TCP connection to the private network. The access gateway may require incoming payload packets to be repacketized according to the tunneling protocol to be sent to the private network. Accordingly, the application specific proxy server may identify the protocols used by the access gateway and/or the private network and may repacketize the incoming application network traffic messages to be correctly formatted for transmission to the private network.

At step 814, the mobile device may establish a TCP connection between the proxy server at the identified dynamic port and the access gateway. For example, an application specific TCP VPN tunnel may generated by the proxy server to tunnel application network traffic and/or the library network traffic to connect to a VPN tunnel to the private network via the access gateway. The mobile device may also instruct the relevant application specific proxy server to generate a socket to the access gateway. The mobile device may instruct the application specific proxy server to maintain the established TCP connection with the access gateway for future TCP traffic that may be directed to the corresponding dynamic port. The mobile device may instruct the application specific proxy server to exchange network management messages to maintain the TCP connection for future use as long as the mobile application is executing on the mobile device.

At step 816, the mobile device may detect application traffic destined for a target destination network address. For example, an application specific proxy server and/or the mobile device may detect that the managed application has issued a system call to connect to a VPN connection. Additionally or alternatively, the application specific proxy server may detect that application network traffic with the destination address that is configured to serve has been generated by the managed application. The managed application may, under instructions of the mobile device and/or the application specific proxy server, direct the application traffic to the application specific proxy server through the corresponding dynamic port's socket to the proxy server.

At step 818, the mobile device may transfer the payload of the detected application traffic at the dynamic port to the proxy server. For example, the mobile device may instruct the relevant application specific proxy server to repacketize the payload of the application network traffic according to the TCP protocol and/or communication standards used by the application gateway.

At step 820, the mobile device may determine whether the payload can be transmitted directly to the destination address of the application traffic. The mobile device may determine whether the network traffic is to be sent to a public network address and/or to a private network through a public network accessible to the mobile device. For example, in some embodiments, the application traffic's destination network address may be a private network address that is only accessible through an access gateway that is accessible to the mobile device through a public network (e.g., Internet). In other embodiments, the application traffic's destination network address may be accessible to the mobile device without having to route traffic through the access gateway. The mobile device may examine the destination network address of the application network traffic to determine whether further processing and/or packetization is required to send the application traffic to its final destination (e.g. formatting the application traffic to be routed to its destination through an access gateway). In determining whether the payload can be transmitted directly to the destination network address or whether it needs to be tunneled through an access gateway, the mobile device may determine whether the application specific TCP server is capable of accessing the destination network address of the application traffic and/or is capable of formatting the application network according to the requirements of the destination network address. Application network traffic that require further reformatting that the application specific TCP server is not capable of performing may be forwarded to the access gateway.

At step 822, in response to determining that the payload can be transmitted directly from the mobile device to the destination network address, the mobile device may transmit the application traffic directly to its destination network address. For example, the application specific TCP proxy server may specify the destination network address that the traffic should be addressed to. The application specific daemon may repacketize the payload of the received application traffic according to the communication protocols used by the destination network address to forward the application traffic appropriately.

At step 824, in response to determining that the payload cannot be transmitted directly to the destination address, the mobile device may transmit the application traffic from the proxy server to the access gateway. Once the application traffic has been appropriately formatted by the application specific proxy server, the mobile device may instruct the proxy server to transmit the repacketized application traffic to the access gateway. The access gateway may be instructed by the mobile device to send the application traffic to the private network. The application specific TCP proxy server may replace the destination path in application network traffic and/or the library network traffic to that of the access gateway. Once the application network traffic and/or the library network traffic reaches the access gateway, the mobile device may instruct the access gateway to process and/or reformat the application network traffic and/or the library network traffic according to the access gateway's policies to prepare such traffic for transmission to the private network via the access gateway.

Figure 8B:
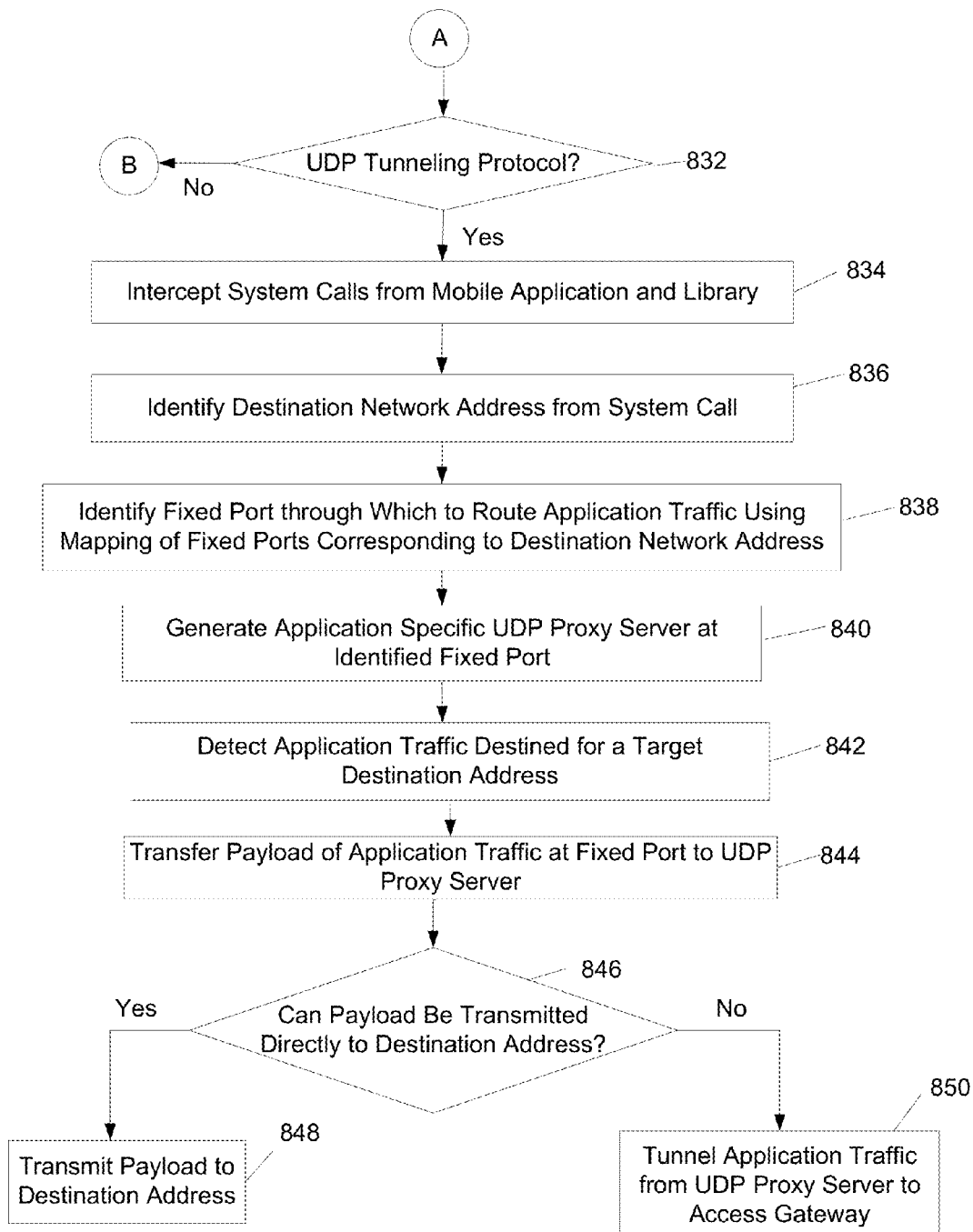
FIG. 8B depicts a flowchart that illustrates a method of generating a mobile UDP VPN connection on a per application basis in accordance with one or more illustrative aspects described herein.

FIG. 8B depicts a flowchart that illustrates a method of generating a mobile UDP VPN connection on a per application basis in accordance with one or more illustrative aspects described herein. In one or more embodiments, the method of FIG. 8B and/or one or more steps thereof may be performed by a computing device (e.g., generic computing device 201). In other embodiments, the method illustrated in FIG. 8B and/or one or more steps thereof may be embodied in computer-executable instructions that are stored in a computer-readable medium, such as a non-transitory computer-readable memory.

As shown in FIG. 8B, at step 832, the mobile device may determine whether the mobile application uses a UDP tunneling protocol. The mobile device may determine whether the mobile VPN system uses a UDP tunneling protocol by monitoring whether the system calls and/or communication protocols examined in step 802 comprise indicators of a UDP communication and/or tunneling protocol being used. For example, the mobile device may examine the communications and/or system calls from the mobile application for known UDP system calls, communication processes, and/or hooks indicative of UDP communication protocols. Upon determining that the mobile application does not use a UDP tunneling protocol, the method may proceed to step 852 of FIG. 8C.

At step 834, upon determining that the mobile application uses a UDP tunneling protocol, the mobile device may intercept system calls from the mobile application and any third party libraries used by the mobile application. The mobile device may examine all system calls issued by the mobile application and/or its associated libraries for specific UDP system calls to connect to a VPN network (e.g., connect( ) and sendto( ) system calls). The mobile device may identify all the system calls to connect to the VPN network and may also identify all application network traffic and/or library network traffic associated with such intercepted system calls.

At step 836, the mobile device may identify a destination network from each intercept system call made by the mobile application and/or its associated third party library. For example, the VPN connection system calls and/or their associated traffic messages may include one or more destination network addresses (e.g. IP address of the private network address). The mobile device may identify such network addresses included in the application traffic messages and/or system calls from the mobile application and/or its associated libraries to determine how to best route such application traffic.

At step 838, the mobile device may identify a fixed port through which to route the application traffic using a mapping of fixed ports corresponding to the destination network address. For example, the mobile device may identify which fixed communication port of the mobile device has been allocated to tunnel the traffic from the corresponding managed application onto a proxy server used to forward the traffic to the access gateway. In identifying the fixed port to use for tunneling application traffic from the managed application, the mobile device may determine which communication ports are available and/or have already been dedicated to serving the managed application.

At step 840, the mobile device may generate an application specific UDP proxy server at the identified fixed port. At the identified fixed communication port of the mobile device, a socket may be generated to a proxy server configured to handle the managed application's traffic and to tunnel said traffic to the private network via the access gateway. The application specific proxy server may be configured to intercept system calls made by for the managed mobile application that it is configured to serve. The application specific proxy server may generate a socket to the access gateway which may handle routing traffic from the public network accessible to the mobile device to the private network. At the application specific proxy server, application network traffic from the managed application may be repacketized to be tunneled to the private network via the access gateway. For example, the payload of the application network traffic may be extracted and formatted according to the UDP protocol used by the access gateway to communicate with the private network. The access gateway may require incoming payload packets to be repacketized according to a UDP tunneling protocol to be sent to the private network. Accordingly, the application specific proxy server may identify the protocols used by the access gateway and/or the private network and may repacketize the incoming application network traffic messages to be correctly formatted for transmission to the private network.

At step 842, the mobile device may detect application traffic destined for the target destination address. For example, an application specific proxy server and/or the mobile device may detect that the managed application has issued a system call to connect to a VPN connection. Additionally or alternatively, the application specific proxy server may detect that application network traffic with the destination address that is configured to serve has been generated by the managed application. The managed application may, under instructions of the mobile device and/or the application specific proxy server, direct the application traffic to the application specific proxy server through the corresponding fixed port's socket to the proxy server.

At step 844, the mobile device may transfer the payload of the application traffic at the fixed port to the UDP proxy server. For example, the mobile device may instruct the relevant application specific proxy server to repacketize the payload of the application network traffic according to the TCP protocol and/or communication standards used by the application gateway.

At step 846, the mobile device may determine whether the payload can be transmitted directly to the destination address of the application traffic. The mobile device may determine whether the network traffic is to be sent to a public network address and/or to a private network through a public network accessible to the mobile device. For example, in some embodiments, the application traffic's destination network address may be a private network address that is only accessible through an access gateway that is accessible to the mobile device through a public network (e.g., Internet). In other embodiments, the application traffic's destination network address may be accessible to the mobile device without having to route traffic through the access gateway. The mobile device may examine the destination network address of the application network traffic to determine whether further processing and/or packetization is required to send the application traffic to its final destination (e.g. formatting the application traffic to be routed to its destination through an access gateway). In determining whether the payload can be transmitted directly to the destination network address or whether it needs to be tunneled through an access gateway, the mobile device may determine whether the application specific UDP proxy server is capable of accessing the destination network address of the application traffic and/or is capable of formatting the application network according to the requirements of the destination network address. Application network traffic that require further reformatting that the application specific UDP proxy server is not capable of performing may be forwarded to the access gateway.

At step 848, in response to determining that the payload can be transmitted directly from the mobile device to the destination network address, the mobile device may transmit the application traffic directly to its destination network address. For example, the application specific UDP proxy server may specify the destination network address that the traffic should be addressed to. The application specific daemon may repacketize the payload of the received application traffic according to the communication protocols used by the destination network address to forward the application traffic appropriately.

At step 850, in response to determining that the payload cannot be transmitted directly to the destination address, the mobile device may transmit the application traffic from the UDP proxy server to the access gateway. Once the application traffic has been appropriately formatted by the application specific proxy server, the mobile device may instruct the proxy server to transmit the repacketized application traffic to the access gateway. The access gateway may be instructed by the mobile device to send the application traffic to the private network. The application specific UDP proxy server may replace the destination path in application network traffic and/or the library network traffic to that of the access gateway. Once the application network traffic and/or the library network traffic reaches the access gateway, the mobile device may instruct the access gateway to process and/or reformat the application network traffic and/or the library network traffic according to the access gateway's policies to prepare such traffic for transmission to the private network via the access gateway.

Figure 8C:
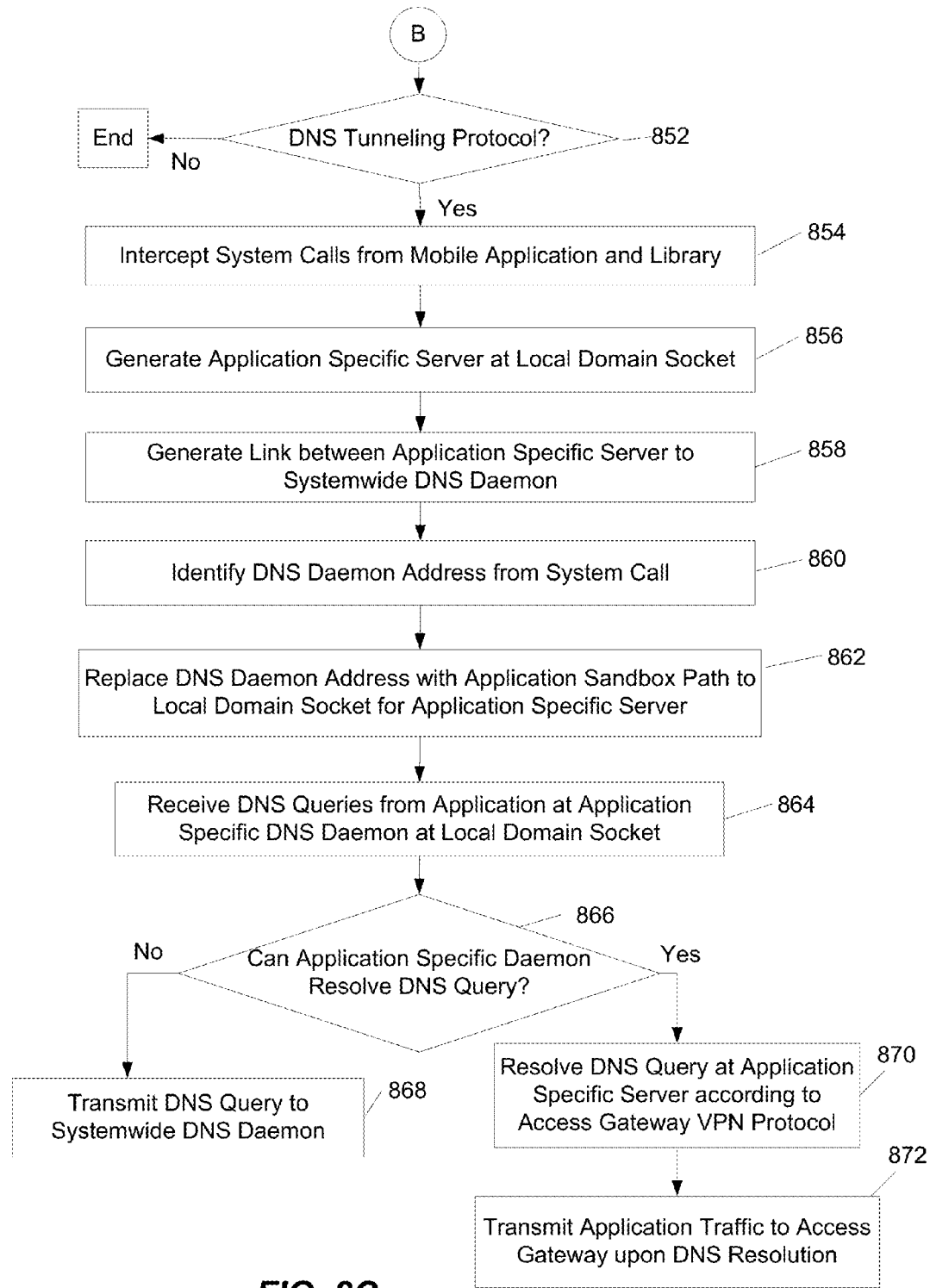
FIG. 8C depicts a flowchart that illustrates a method of generating a mobile DNS VPN connection on a per application basis in accordance with one or more illustrative aspects described herein.

FIG. 8C depicts a flowchart that illustrates a method of generating a mobile DNS VPN connection on a per application basis in accordance with one or more illustrative aspects described herein. In one or more embodiments, the method of FIG. 8C and/or one or more steps thereof may be performed by a computing device (e.g., generic computing device 201). In other embodiments, the method illustrated in FIG. 8C and/or one or more steps thereof may be embodied in computer-executable instructions that are stored in a computer-readable medium, such as a non-transitory computer-readable memory.

As shown in FIG. 8C, at step 852, the mobile device may determine whether the mobile application uses a DNS tunneling protocol. The mobile device may determine whether the mobile VPN system uses a DNS tunneling protocol by monitoring whether the system calls and/or communication protocols examined in step 802 comprise indicators of a DNS communication and/or tunneling protocol being used. For example, the mobile device may examine the communications and/or system calls from the mobile application for known DNS system calls, DNS queries, communication processes, and/or hooks indicative of DNS communication protocols. Upon determining that the mobile application does not use a DNS tunneling protocol and having determined that the mobile application also does not use a TCP or UDP tunneling protocol, the method may terminate.

At step 854, upon determining that the mobile application uses a DNS tunneling protocol, the mobile device may intercept system calls from the mobile application and any third party libraries used by the mobile application. The mobile device may examine all system calls issued by the mobile application and/or its associated libraries for specific DNS system calls to connect to a VPN network. The mobile device may identify all the system calls to connect to the VPN network and may also identify all application network traffic and/or library network traffic associated with such intercepted system calls.

At step 856, the mobile device may generate an application specific proxy server at a local domain socket. The mobile device may generate an application sandbox path at which an application specific DNS proxy server may receive traffic to be tunneled to the private network. The mobile device may generate a local socket to a proxy server configured to handle the managed application's traffic and to tunnel said traffic to the private network via the access gateway. The mobile device may also generate an application specific proxy server at this that is communicatively coupled to the generated local socket at the application sandbox path. The application specific proxy server may be generated to be dedicated to only one managed application and to tunnel its traffic to the private network via the access gateway. The application specific proxy server may be configured to intercept system calls made by for the managed mobile application that it is configured to serve. The application specific proxy server may generate a socket to the access gateway which may handle routing traffic from the public network accessible to the mobile device to the private network. The mobile device may generate an application specific DNS daemon at the application specific DNS proxy server to resolve the DNS queries of the DNS application traffic that may be directed to it. At the application specific proxy server, application network traffic from the managed application may be repacketized to be tunneled to the private network via the access gateway. For example, the proxy server may be configured to extract the payload of the application network traffic and format it according to the DNS protocol used by the access gateway to communicate with the private network. The access gateway may require incoming payload packets to be repacketized according to a DNS tunneling protocol to be sent to the private network. Accordingly, the application specific proxy server may identify the protocols used by the access gateway and/or the private network and may repacketize the incoming application network traffic messages to be correctly formatted for transmission to the private network.

At step 858, the mobile device may generate a link between the application server and a system-wide DNS daemon. For example, the mobile device may generate a socket between the application specific proxy DNS server and a system-wide DNS daemon. Such a link may be generated to forward any application traffic that the application specific DNS daemon may not be able to resolve and may require the assistance of the system-wide DNS daemon.

At step 860, the mobile device may identify a DNS daemon address from the intercepted system call(s). The intercepted system calls to connect to a VPN connection and/or the application network traffic and/or the library network traffic associated with such intercepted system calls may be inspected to identify the address of a DNS daemon to which the system calls and/or the application traffic are destined. DNS traffic and/or system calls may include DNS queries that need to be resolved by a DNS daemon and may include the path and/or address of the DNS daemon.

At step 862, the mobile device may replace the DNS daemon address with an application sandbox path to the local domain socket to connect to the application specific proxy server. Upon identifying the DNS daemon address and/or path from the intercepted system call(s) at step 860, the mobile device may replace the path of the DNS daemon in the system call(s) and/or the application network traffic with an application sandbox path at which an application specific DNS daemon may execute. The mobile device may determine which application generates the system call and/or the application traffic to be sent over the VPN and identifies the application proxy server on which an application specific DNS daemon for the corresponding identified mobile application is executing. The mobile device may direct such system call(s) and/or the associated application traffic to the identified proxy server.

At step 864, the DNS queries from the application at the application specific DNS daemon may be received at the local domain socket. Once the mobile device has determined which application specific proxy server to use to forward DNS queries, system calls, and/or the application traffic for a given application, the mobile device identifies forwards the DNS queries from that mobile application to the application specific DNS daemon at the identified proxy server. The local socket of the application specific proxy server may receive such traffic messages and in particular, receive the DNS queries for such traffic messages.

At step 866, the mobile device may determine whether the application specific daemon can resolve the received DNS queries. The mobile device may instruct the application specific proxy server to determine whether it can resolve the DNS queries that it has received at step 864. For example, the application specific DNS daemon may be instructed to process the application network traffic and/or the library network traffic's associated DNS queries using policies used by the access gateway. For example, the application specific DNS daemon may determine whether the DNS requests and/or the related application network traffic and/or the library network traffic received through the application sandbox path for the corresponding application can be resolved locally by the application specific DNS daemon. DNS requests that require further reformatting according to the access gateway's policies and that cannot be performed at application specific DNS daemon may be forwarded to the system level DNS daemon.

At step 868, in response to determining that the application specific daemon is unable to resolve the DNS query, the mobile device may transmit the DNS query to the system-level DNS daemon. For example, the application specific DNS daemon may redirect the application network traffic and/or the library network traffic that it has received from local domain socket to a system level DNS path through the link (e.g. socket) that was generated in step 858. The application specific DNS daemon may replace the destination path in the DNS queries of the application network traffic and/or the library network traffic that cannot be resolved at the proxy server to that of the system level DNS path to transmit the traffic to the system level daemon. Once the application network traffic and/or the library network traffic reaches the system level DNS daemon, the mobile device may instruct the system level DNS daemon may process and/or reformat the application network traffic and/or the library network traffic according to the access gateway's policies to prepare such traffic for transmission to the private network via the access gateway. The system level DNS daemon may resolve the DNS queries that the application specific DNS daemon may not have performed on such redirected traffic packets.

At step 870, in response to determining that the application specific daemon is able to resolve the DNS query, the mobile device may instruct the application specific daemon at the application specific proxy server to resolve the DNS query according to VPN protocols of the access gateway. For example, the application specific daemon may specify the destination network address in the private network that the traffic should be addressed to. The application specific daemon may repacketize the payload of the received application traffic according to the DNS and/or other communication protocols used by the access gateway to forward the application traffic to the private network via the access gateway.

At step 872, the mobile device may transmit application traffic to the access gateway from the application specific proxy server upon DNS resolution. Once the application traffic has been appropriately formatted and resolved, the mobile device may instruct the proxy server to transmit the repacketized application traffic to the access gateway. The access gateway may be instructed by the mobile device to send the application traffic to the private network.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   determining, by a processor of a mobile device, that a mobile application executing on the mobile device requests to communicate with a private network;
   intercepting, by a processor, one or more system calls to communicate with the private network issued by the mobile application executing on the mobile device;
   responsive to determining that the one or more system calls are addressed to a domain socket path, replacing the domain socket path in the one or more system calls with a sandbox path that corresponds to the mobile application;
   generating, by the processor, a communication link to a virtual private network (VPN) server at the sandbox path through which to transmit communications from the mobile application to the private network; and
   instructing, by the processor, the VPN server to transmit one or more messages from the mobile application to an access gateway for forwarding to the private network.

2. The method of claim 1, further comprising:
   determining, by the processor, that the one or more system calls comprise at least one domain name system (DNS) query addressed to a system level DNS process; and wherein replacing the domain socket path in the one or more system calls with the sandbox path further comprises:
  generating, by the processor, the sandbox path at a local domain socket through which to transmit communications from the mobile application to the private network; and
  generating, by the processor and for the mobile application, the VPN server that is communicatively coupled to the local domain socket.

3. The method of claim 2, further comprising:
  generating, by the processor, an application specific DNS process at the VPN server that is communicatively coupled to the local domain socket.

4. The method of claim 2, further comprising:
  identifying, by the processor, a destination network address of at least one message associated with the one or more system calls; and
  transmitting, by the processor, the at least one message to the VPN server that is communicatively coupled to the local domain socket for DNS resolution; and
  instructing, by the processor, an application specific DNS process at the VPN server to transmit the one or more messages to the access gateway for forwarding to the private network.

5. The method of claim 1, wherein instructing the VPN server to transmit the one or more messages from the mobile application to the access gateway further comprises:
  instructing, by the processor, the VPN server at the sandbox path to generate one or more packets from the one or more messages according to a DNS protocol of the communication link used to transmit the one or more messages to the private network; and
  instructing, by the processor, the VPN server to transmit the one or more packets processed according to the DNS protocol to the private network over the communication link.

6. The method of claim 1, further comprising:
  determining, by the processor, that a plurality of different messages from a plurality of different mobile applications executing on the mobile device are destined for the private network;
  generating, by the processor, a plurality of sandbox paths, wherein each sandbox path of the plurality of sandbox paths is generated at a different local domain socket of a plurality of local domain sockets to transmit communications from a corresponding mobile application of the plurality of different mobile applications to the private network;
  generating, by the processor and for the mobile application, a plurality of VPN servers, wherein each of the plurality of VPN servers is communicatively coupled to a corresponding local domain socket of the plurality of local domain sockets; and
  generating, by the processor, a plurality of application specific DNS processes, wherein each application specific DNS process executes at a corresponding VPN server of the plurality of VPN servers that is communicatively coupled to a corresponding local domain socket of the plurality of local domain sockets.

7. The method of claim 2, further comprising:
  responsive to determining that the at least one DNS query needs to be resolved by the system level DNS process, transmitting, by the processor, at least one message associated with the one or more system calls to the system level DNS process for DNS resolution.

8. One or more non-transitory computer readable storage media storing computer readable instructions that, when execute, cause a mobile device to perform a method comprising:
  determining, by a processor of the mobile device, that a mobile application executing on the mobile device requests to communicate with a private network;
  intercepting, by the processor, one or more system calls to communicate with the private network issued by the mobile application executing on the mobile device;
  responsive to determining that the one or more system calls are addressed to a domain socket path, replacing the domain socket path in the one or more system calls with a sandbox path that corresponds to the mobile application;
  generating, by the processor, a communication link to a virtual private network (VPN) server at the sandbox path through which to transmit communications from the mobile application to the private network; and
  instructing, by the processor, the VPN server to transmit one or more messages from the mobile application to an access gateway for forwarding to the private network.

9. The computer readable storage media of claim 8, said method further comprising:
  determining, by the processor, that the one or more system calls comprise at least one domain name system (DNS) query addressed to a system level DNS process; and
  wherein replacing the domain socket path in the one or more system calls with the sandbox path further comprises:
    generating, by the processor, the sandbox path at a local domain socket through which to transmit communications from the mobile application to the private network; and
    generating, by the processor and for the mobile application, the VPN server that is communicatively coupled to the local domain socket.

10. The computer readable storage media of claim 9, said method further comprising:
  generating, by the processor, an application specific DNS process at the VPN server that is communicatively coupled to the local domain socket.

11. The computer readable storage media of claim 9, said method further comprising:
  identifying, by the processor, a destination network address of at least one message associated with the one or more system calls; and
  transmitting, by the processor, the at least one message to the VPN server that is communicatively coupled to the local domain socket for DNS resolution; and
  instructing, by the processor, an application specific DNS process at the VPN server to transmit the one or more messages to the access gateway for forwarding to the private network.

12. The computer readable storage media of claim 8, wherein instructing the VPN server to transmit the one or more messages from the mobile application to the access gateway further comprises:
  instructing, by the processor, the VPN server at the sandbox path to generate one or more packets from the one or more messages according to a DNS protocol of the communication link used to transmit the one or more messages to the private network; and instructing, by the processor, the VPN server to transmit the one or more packets processed according to the DNS protocol to the private network over the communication link.

13. The computer readable storage media of claim 8, said method further comprising:
   determining, by the processor, that a plurality of different messages from a plurality of different mobile applications executing on the mobile device are destined for the private network;
   generating, by the processor, a plurality of sandbox paths, wherein each sandbox path of the plurality of sandbox paths is generated at a different local domain socket of a plurality of local domain sockets to transmit communications from a corresponding mobile application of the plurality of different mobile applications to the private network;
   generating, by the processor and for the mobile application, a plurality of VPN servers, wherein each of the plurality of VPN servers is communicatively coupled to a corresponding local domain socket of the plurality of local domain sockets; and
   generating, by the processor, a plurality of application specific DNS processes, wherein each application specific DNS process executes at a corresponding VPN server of the plurality of VPN servers that is communicatively coupled to a corresponding local domain socket of the plurality of local domain sockets.

14. The computer readable storage media of claim 9, said method further comprising:
   responsive to determining that the at least one DNS query needs to be resolved by the system level DNS process, transmitting, by the processor, at least one message associated with the one or more system calls to the system level DNS process for DNS resolution.

15. A mobile device comprising:
   a processor; and
   memory storing readable instructions that, when executed by the processor, cause the mobile device to perform:
   determining, by the processor, that a mobile application executing on the mobile device requests to communicate with a private network;
   intercepting, by the processor, one or more system calls to communicate with the private network issued by the mobile application executing on the mobile device;
   responsive to determining that the one or more system calls are addressed to a domain socket path, replacing the domain socket path in the one or more system calls with a sandbox path that corresponds to the mobile application;
   generating, by the processor, a communication link to a virtual private network (VPN) server at the sandbox path through which to transmit communications from the mobile application to the private network; and
   instructing, by the processor, the VPN server to transmit one or more messages from the mobile application to an access gateway for forwarding to the private network.

16. The mobile device of claim 15, wherein the computer readable instructions, when executed by the processor, further cause the mobile device to perform:
   determining, by the processor, that the one or more system calls comprise at least one domain name system (DNS) query addressed to a system level DNS process; and
   wherein replacing the domain socket path in the one or more system calls with the sandbox path further comprises:
      generating, by the processor, the sandbox path at a local domain socket through which to transmit communications from the mobile application to the private network; and
      generating, by the processor and for the mobile application, the VPN server that is communicatively coupled to the local domain socket.

17. The mobile device of claim 16, wherein the computer readable instructions, when executed by the processor, further cause the mobile device to perform:
   generating, by the processor, an application specific DNS process at the VPN server that is communicatively coupled to the local domain socket.

18. The mobile device of claim 16, wherein the computer readable instructions, when executed by the processor, further cause the mobile device to perform:
   identifying, by the processor, a destination network address of at least one message associated with the one or more system calls; and
   transmitting, by the processor, the at least one message to the VPN server that is communicatively coupled to the local domain socket for DNS resolution; and
   instructing, by the processor, an application specific DNS process at the VPN server to transmit the one or more messages to the access gateway for forwarding to the private network.

19. The mobile device of claim 15, wherein instructing the VPN server to transmit the one or more messages from the mobile application to the access gateway further comprises:
   instructing, by the processor, the VPN server at the sandbox path to generate one or more packets from the one or more messages according to a DNS protocol of the communication link used to transmit the one or more messages to the private network; and
   instructing, by the processor, the VPN server to transmit the one or more packets processed according to the DNS protocol to the private network over the communication link.

20. The mobile device of claim 15, wherein the computer readable instructions, when executed by the processor, further cause the mobile device to perform:
   determining, by the processor, that a plurality of different messages from a plurality of different mobile applications executing on the mobile device are destined for the private network;
   generating, by the processor, a plurality of sandbox paths, wherein each sandbox path of the plurality of sandbox paths is generated at a different local domain socket of a plurality of local domain sockets to transmit communications from a corresponding mobile application of the plurality of different mobile applications to the private network;
   generating, by the processor and for the mobile application, a plurality of VPN servers, wherein each of the plurality of VPN servers is communicatively coupled to a corresponding local domain socket of the plurality of local domain sockets; and
   generating, by the processor, a plurality of application specific DNS processes, wherein each application specific DNS process executes at a corresponding VPN server of the plurality of VPN servers that is communicatively coupled to a corresponding local domain socket of the plurality of local domain sockets.

21. The mobile device of claim 16, wherein the computer readable instructions, when executed by the processor, further cause the mobile device to perform:

responsive to determining that the at least one DNS query needs to be resolved by the system level DNS process, transmitting, by the processor, at least one message associated with the one or more system calls to the system level DNS process for DNS resolution.

\* \* \* \* \*